(12) United States Patent
Rajasingham

(10) Patent No.: US 8,864,229 B2
(45) Date of Patent: Oct. 21, 2014

(54) OCCUPANT SUPPORT SYSTEM

(76) Inventor: Arjuna Indraesewaran Rajasingham, Bethesda, MD (US)

( * ) Notice: Subject to any disclaimer, the term of this patent is extended or adjusted under 35 U.S.C. 154(b) by 962 days.

(21) Appl. No.: 12/451,317

(22) PCT Filed: May 7, 2008

(86) PCT No.: PCT/US2008/005810
§ 371 (c)(1),
(2), (4) Date: Nov. 6, 2009

(87) PCT Pub. No.: WO2008/137156
PCT Pub. Date: Nov. 13, 2008

(65) Prior Publication Data
US 2010/0171348 A1    Jul. 8, 2010

Related U.S. Application Data

(63) Continuation-in-part of application No. 11/639,088, filed on Dec. 14, 2006, now Pat. No. 8,251,444.

(60) Provisional application No. 60/928,040, filed on May 7, 2007, provisional application No. 60/962,077, filed on Jul. 26, 2007, provisional application No. 60/960,067, filed on Sep. 13, 2007, provisional application No. 60/960,620, filed on Oct. 5, 2007, provisional application No. 61/066,372, filed on Feb. 20, 2008, provisional application No. 61/006,074, filed on Dec. 17, 2007.

(51) Int. Cl.
*B60N 2/42* (2006.01)
*B60N 2/28* (2006.01)
*B60N 2/34* (2006.01)
*B60N 2/22* (2006.01)
*B60N 2/427* (2006.01)
*B60N 2/48* (2006.01)
*B64D 11/06* (2006.01)

(52) U.S. Cl.
CPC ............... *B60N 2/34* (2013.01); *B60N 2/4235* (2013.01); *B60N 2/2878* (2013.01); *B60N 2/2209* (2013.01); *B60N 2/42736* (2013.01); *B60N 2/4221* (2013.01); *B60N 2/2851* (2013.01); *B60N 2/48* (2013.01); *B64D 11/0689* (2013.01); *B60N 2/2872* (2013.01); *B60N 2/4882* (2013.01)
USPC .................................. 297/216.16; 297/250.1

(58) Field of Classification Search
USPC ............ 297/216.19, 216.11, 216.14, 216.15, 297/312, 216.16, 250.1, 216.2
See application file for complete search history.

(56) References Cited

U.S. PATENT DOCUMENTS

| | | | | |
|---|---|---|---|---|
| 2,012,042 A | * | 8/1935 | Gerlofson et al. | 267/145 |
| 2,777,531 A | * | 1/1957 | Erickson | 180/270 |
| 2,782,834 A | * | 2/1957 | Vigo | 297/180.14 |
| 2,992,604 A | * | 7/1961 | Trotman et al. | 454/120 |
| 3,266,064 A | * | 8/1966 | Figman | 5/726 |

(Continued)

FOREIGN PATENT DOCUMENTS

| | | | | |
|---|---|---|---|---|
| EP | 164909 A2 | * | 12/1985 | B60N 1/12 |
| FR | 2580916 A3 | * | 10/1986 | A47D 1/10 |

(Continued)

*Primary Examiner* — David R Dunn

(57) ABSTRACT

Human support systems for one or more of the safety, convenience, comfort of the user.

10 Claims, 24 Drawing Sheets

(56) References Cited

U.S. PATENT DOCUMENTS

| | | | |
|---|---|---|---|
| 3,506,308 A * | 4/1970 | Fenton | 297/452.47 |
| 3,582,133 A * | 6/1971 | DeLavenne | 296/68.1 |
| 3,802,737 A * | 4/1974 | Mertens | 297/216.2 |
| 4,067,608 A * | 1/1978 | Von Wimmersperg | 297/216.11 |
| 4,311,339 A * | 1/1982 | Heath | 297/487 |
| 4,349,167 A * | 9/1982 | Reilly | 244/122 R |
| 5,002,336 A * | 3/1991 | Feher | 297/180.13 |
| 5,004,294 A * | 4/1991 | Lin | 297/180.11 |
| 5,022,669 A * | 6/1991 | Johnson | 280/30 |
| 5,226,188 A * | 7/1993 | Liou | 5/653 |
| 5,403,065 A * | 4/1995 | Callerio | 297/180.11 |
| 5,405,179 A * | 4/1995 | Jih | 297/452.49 |
| 5,590,428 A * | 1/1997 | Roter | 5/726 |
| 5,664,830 A * | 9/1997 | Garcia et al. | 297/216.11 |
| 6,042,181 A * | 3/2000 | Goor | 297/216.11 |
| 6,109,688 A * | 8/2000 | Wurz et al. | 297/180.14 |
| 6,299,249 B1 * | 10/2001 | Mori | 297/256.13 |
| 6,347,832 B2 * | 2/2002 | Mori | 297/256.13 |
| 6,386,632 B1 * | 5/2002 | Goor et al. | 297/216.11 |
| 6,634,708 B2 * | 10/2003 | Guenther | 297/216.11 |
| 6,773,065 B1 * | 8/2004 | Stamper | 297/256.12 |
| 6,796,610 B2 * | 9/2004 | Nakagawa et al. | 297/256.16 |
| 7,219,958 B2 * | 5/2007 | Yamazaki et al. | 297/256.13 |
| 7,341,645 B2 * | 3/2008 | Fong | 296/68.1 |
| 7,744,154 B2 * | 6/2010 | Marsden et al. | 297/216.11 |
| 7,753,442 B2 * | 7/2010 | Liberkowski | 297/216.11 |
| 8,235,461 B2 * | 8/2012 | Cohen | 297/180.13 |
| 8,550,553 B1 * | 10/2013 | Clark et al. | 297/216.17 |
| 2002/0060483 A1 * | 5/2002 | Yoshida et al. | 297/250.1 |
| 2002/0175544 A1 * | 11/2002 | Goor et al. | 297/216.11 |
| 2004/0232747 A1 * | 11/2004 | Yamazaki et al. | 297/250.1 |
| 2009/0102253 A1 * | 4/2009 | Forbes et al. | 297/216.11 |
| 2010/0026059 A1 * | 2/2010 | Amirault et al. | 297/216.11 |
| 2010/0231012 A1 * | 9/2010 | Marsden et al. | 297/216.11 |
| 2010/0259077 A1 * | 10/2010 | Forbes et al. | 297/216.11 |
| 2010/0295341 A1 * | 11/2010 | Marsden et al. | 297/216.11 |
| 2010/0295342 A1 * | 11/2010 | Marsden et al. | 297/216.11 |
| 2010/0295343 A1 * | 11/2010 | Marsden et al. | 297/216.11 |
| 2010/0295344 A1 * | 11/2010 | Marsden et al. | 297/216.11 |
| 2010/0295346 A1 * | 11/2010 | Marsden et al. | 297/216.11 |
| 2010/0295347 A1 * | 11/2010 | Marsden et al. | 297/216.11 |
| 2011/0062756 A1 * | 3/2011 | Campbell et al. | 297/250.1 |
| 2011/0227376 A1 * | 9/2011 | Franck et al. | 297/216.11 |
| 2011/0233975 A1 * | 9/2011 | Mindel et al. | 297/216.17 |

FOREIGN PATENT DOCUMENTS

| | | | |
|---|---|---|---|
| FR | 2596338 A1 * | 10/1987 | B60N 1/12 |
| GB | 2202433 A * | 9/1988 | B60N 1/12 |
| JP | 62128844 A * | 6/1987 | B60N 1/12 |

* cited by examiner

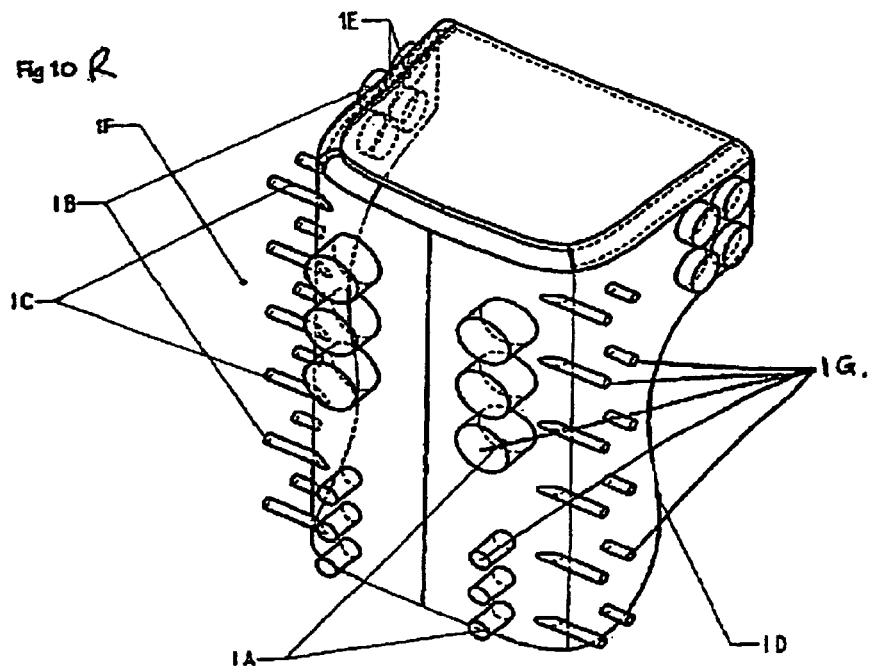
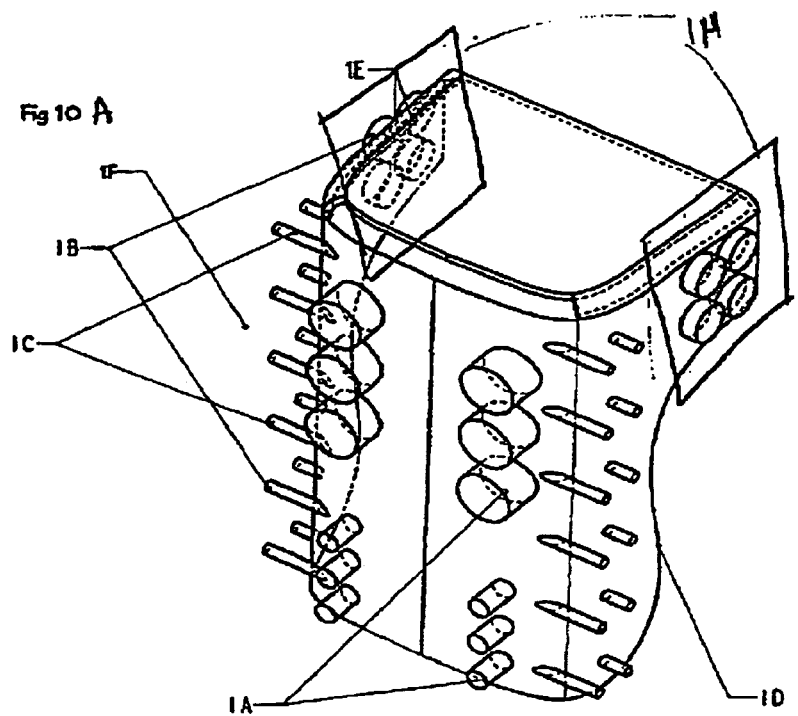

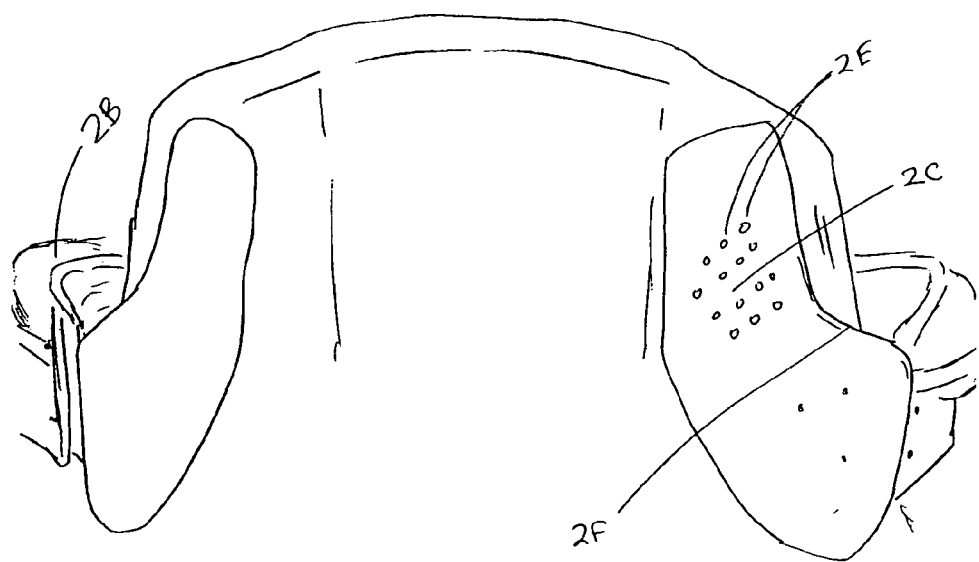
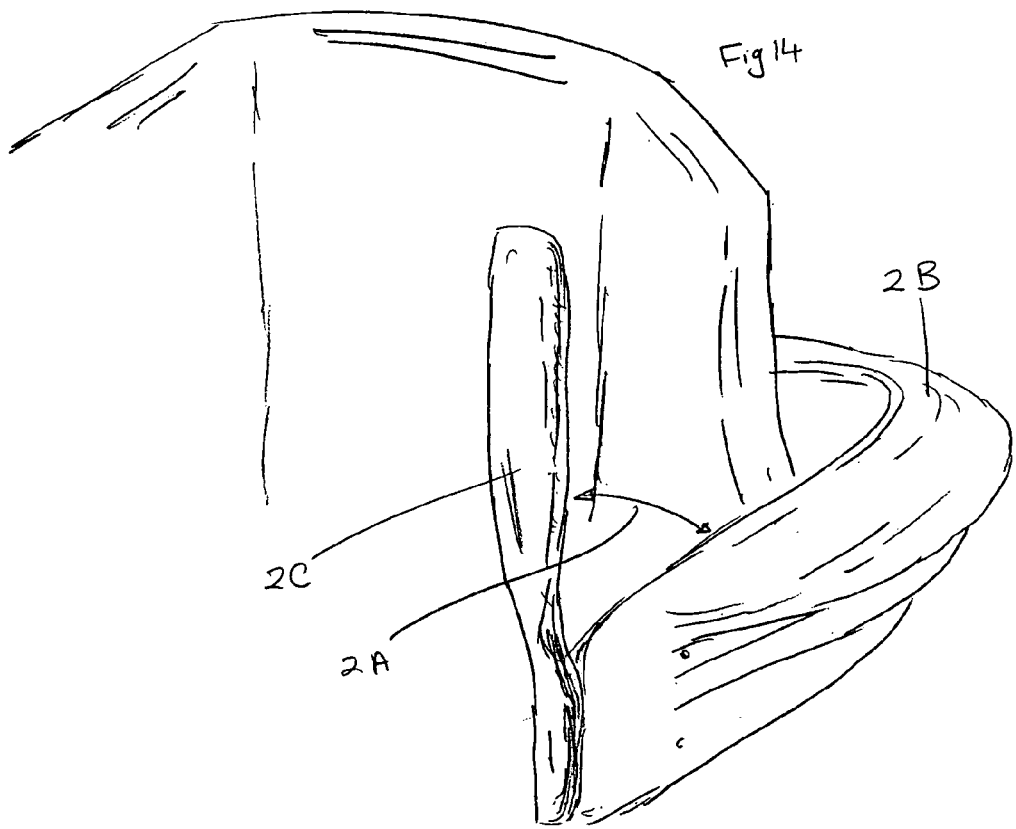

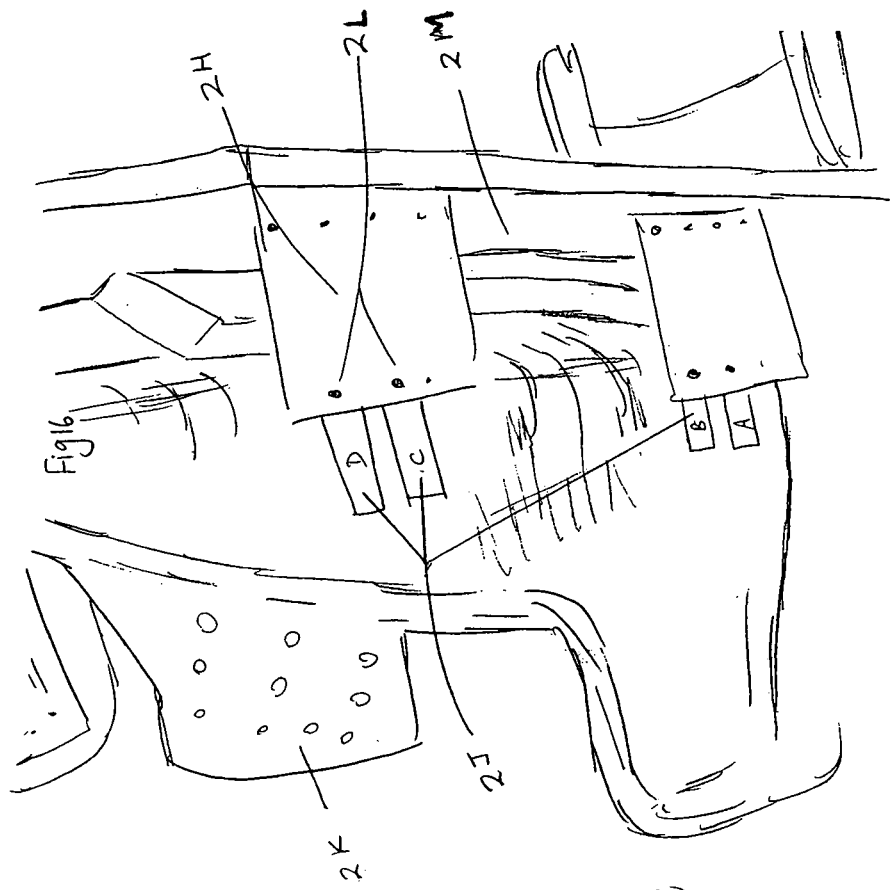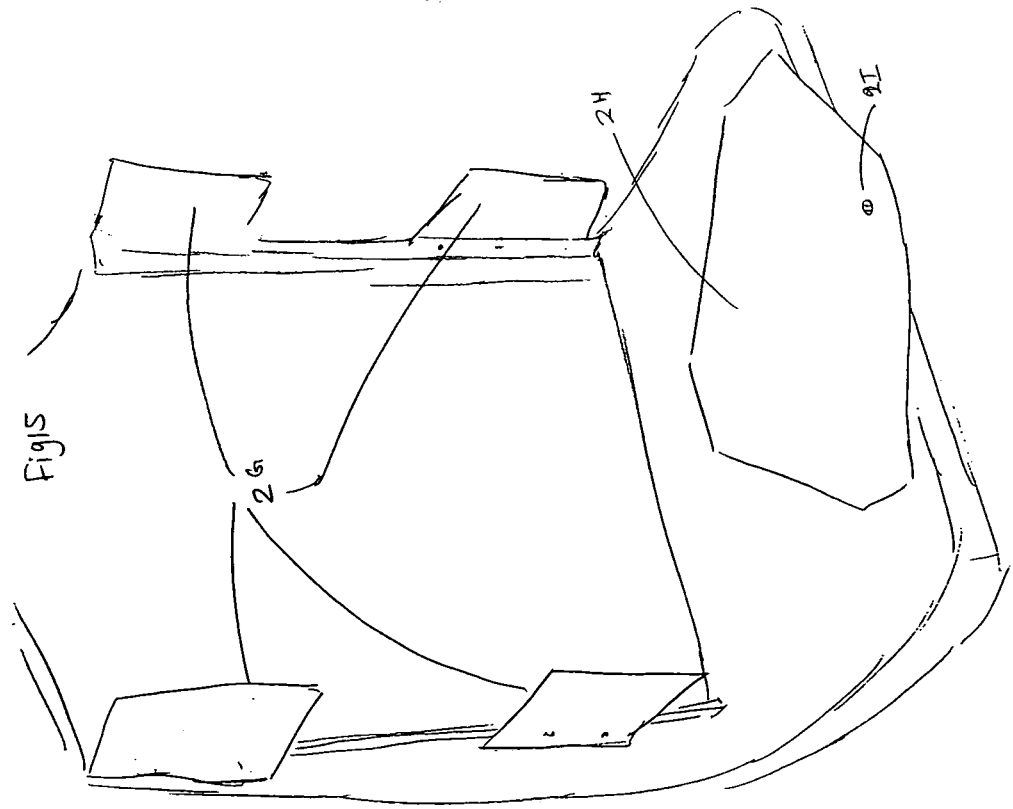

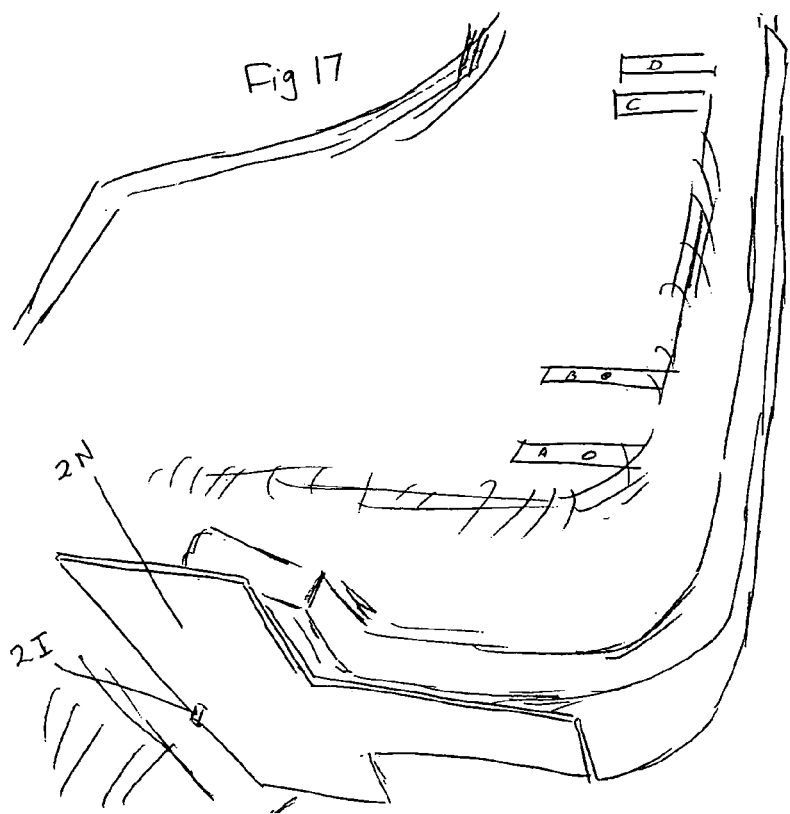
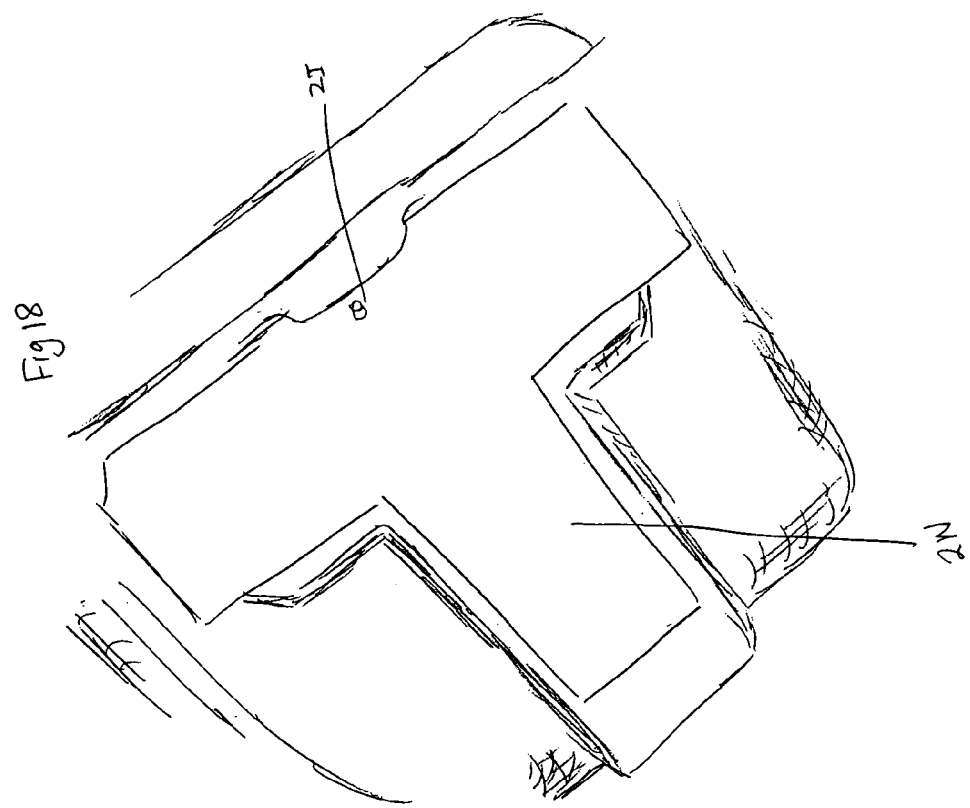

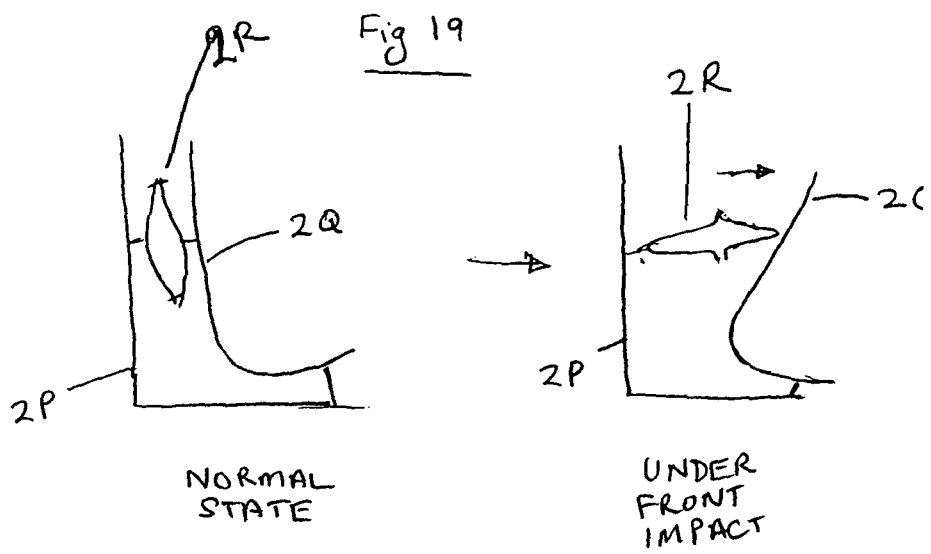
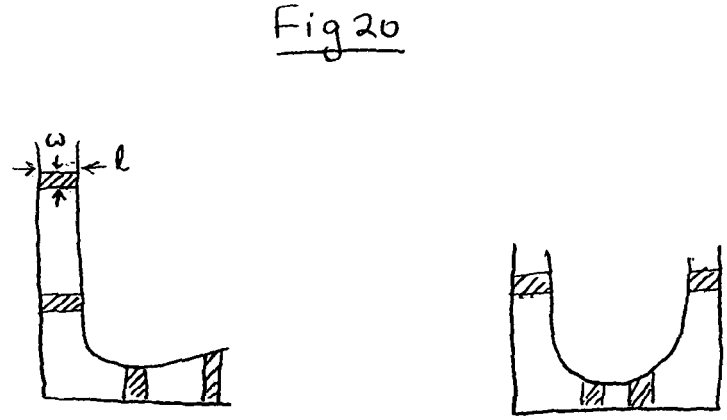

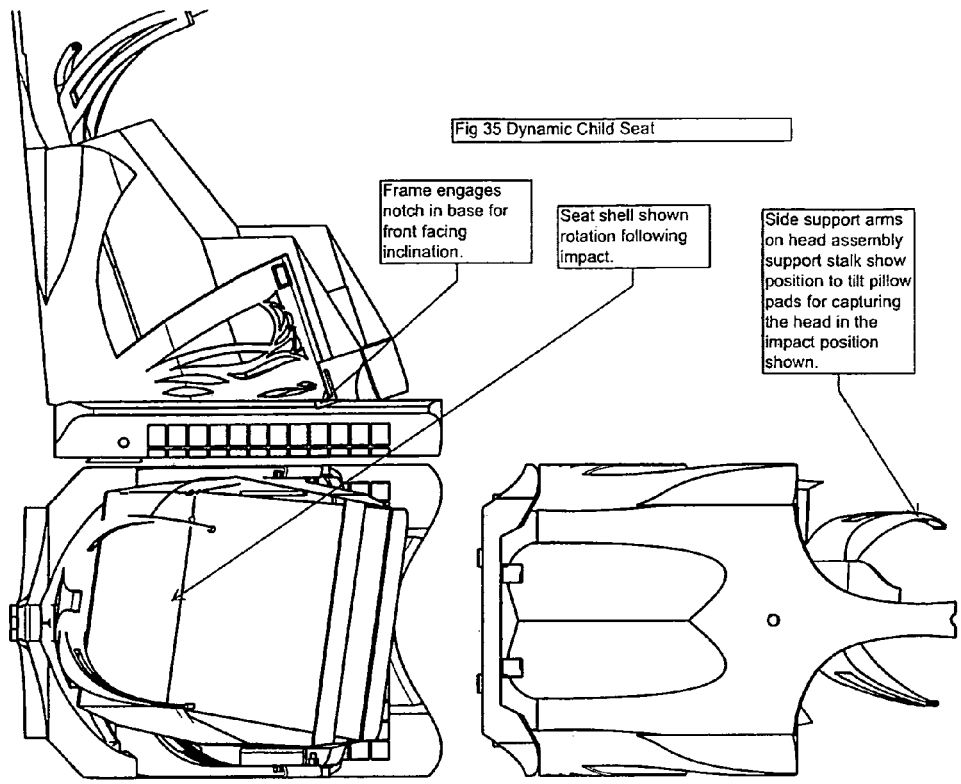
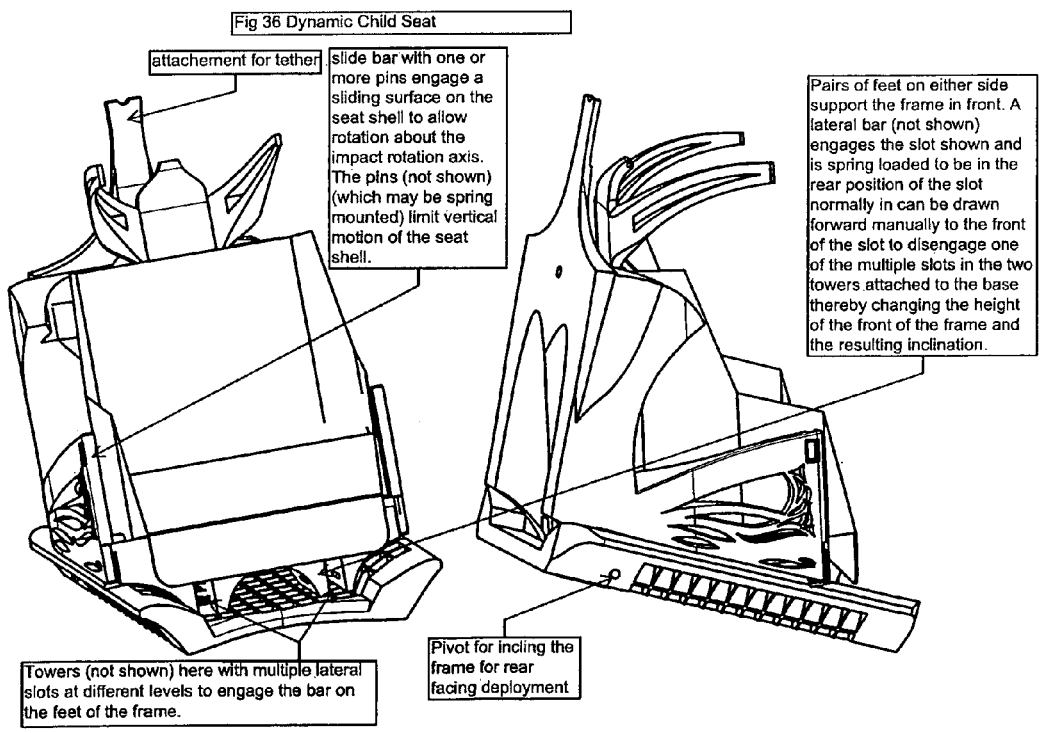

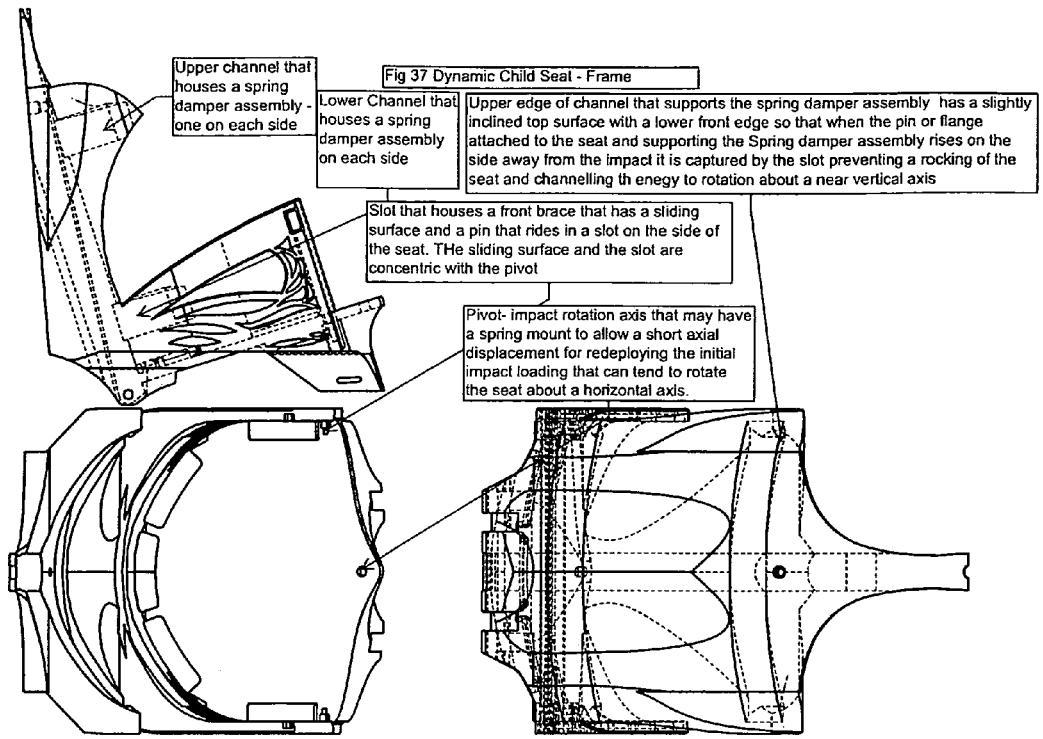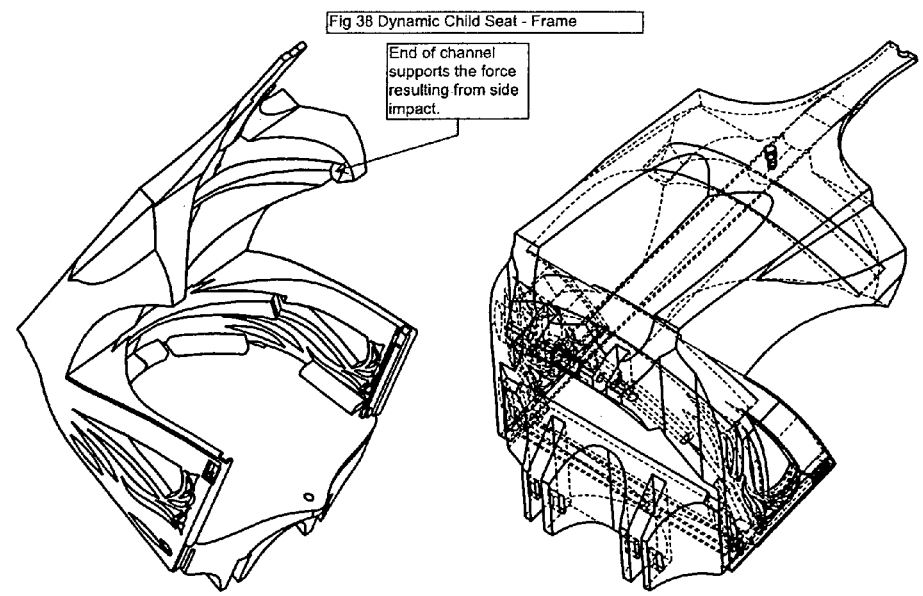

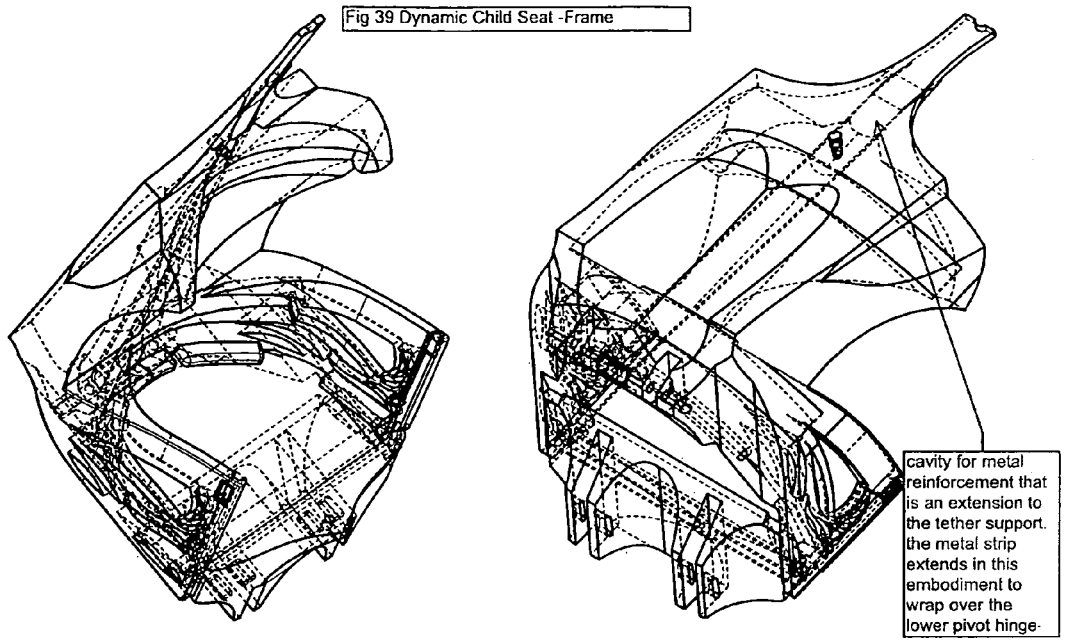
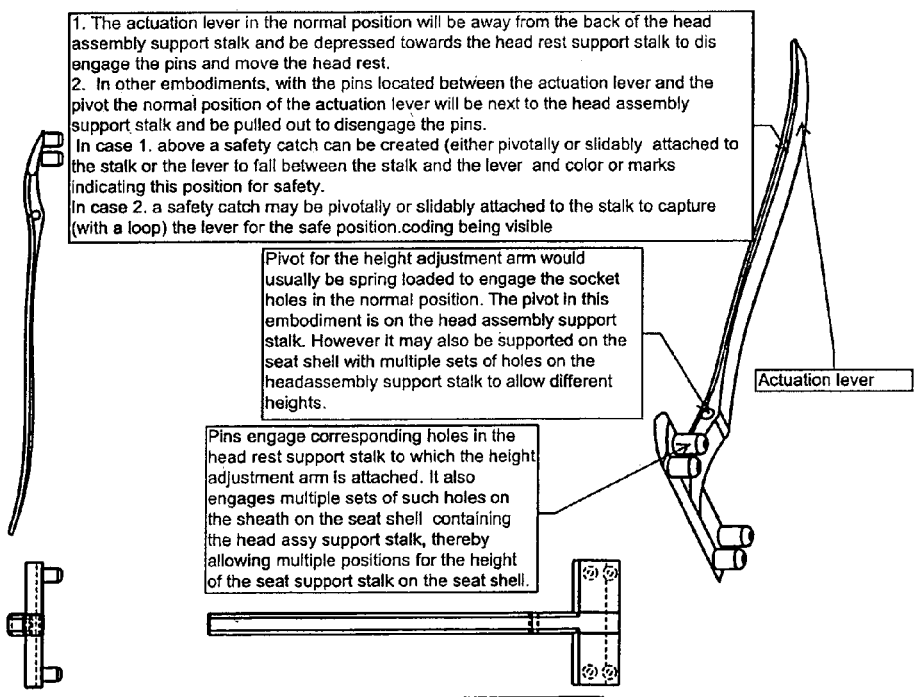

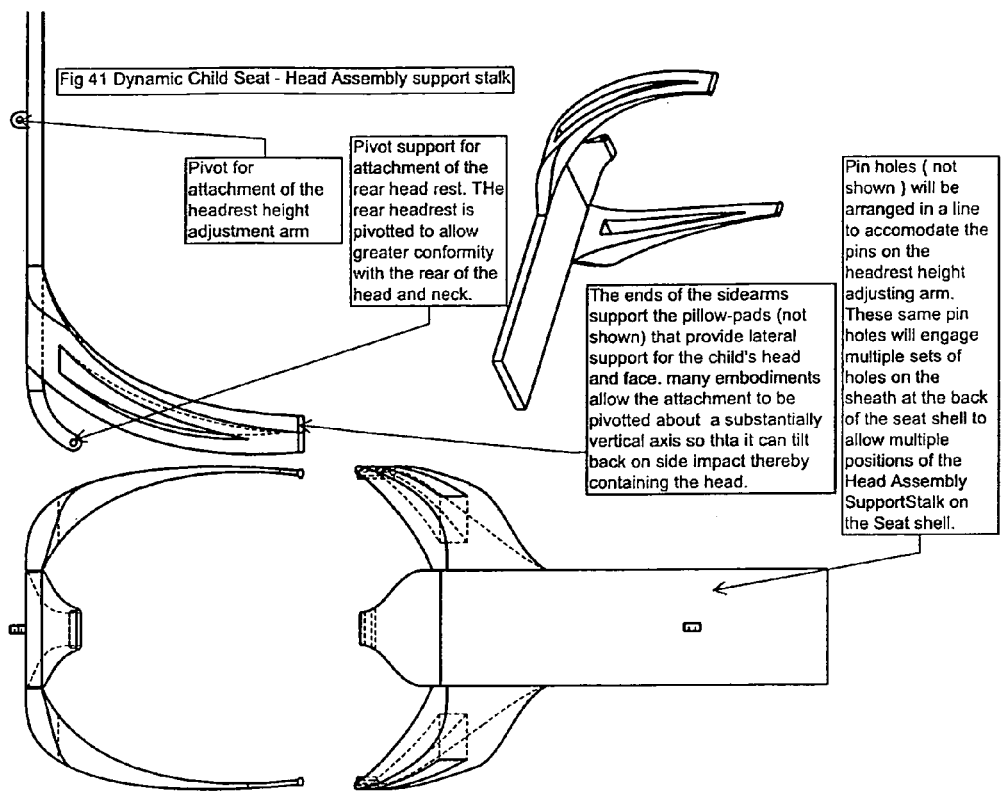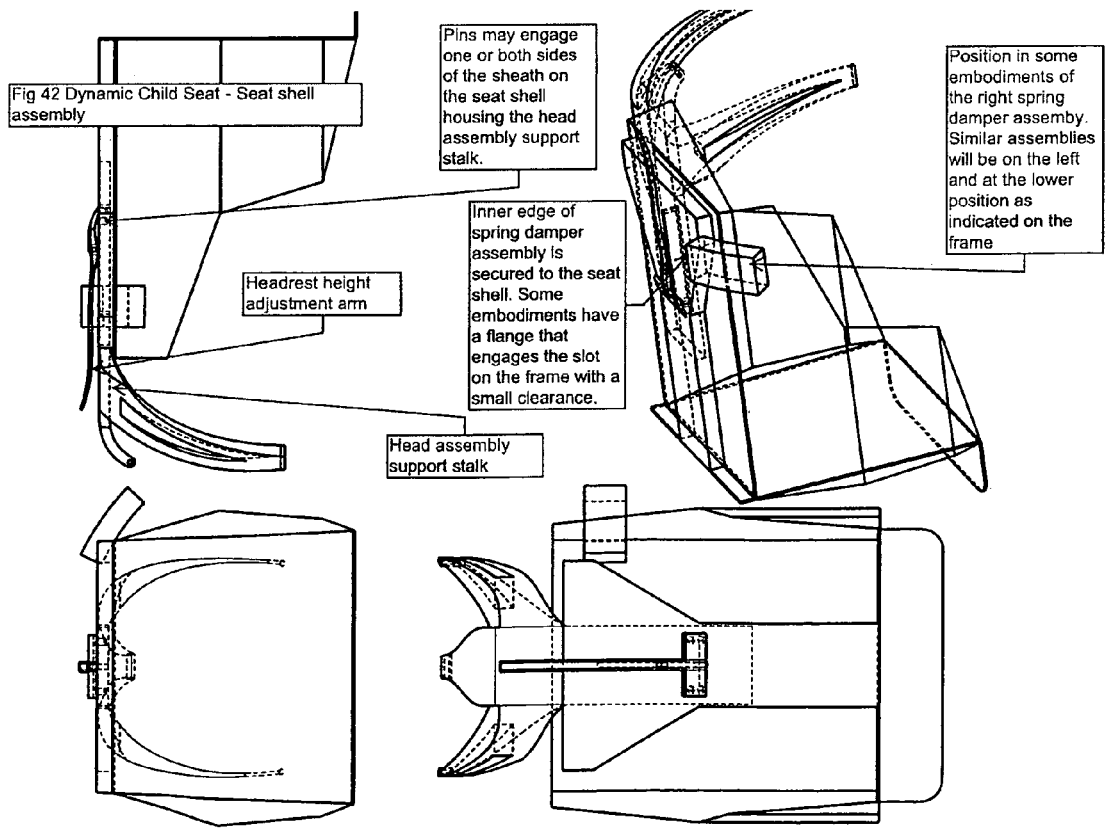

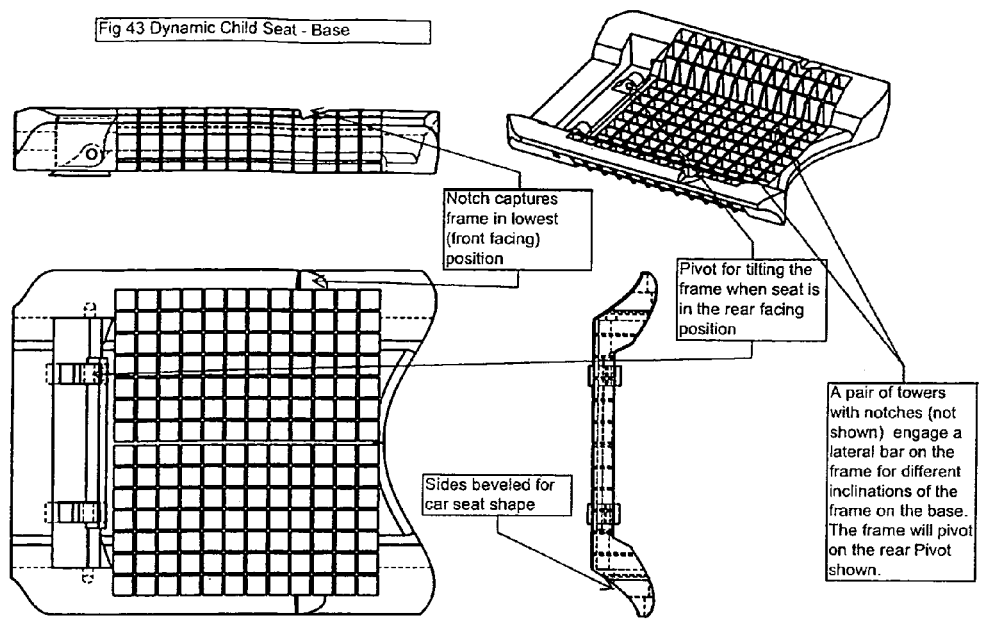
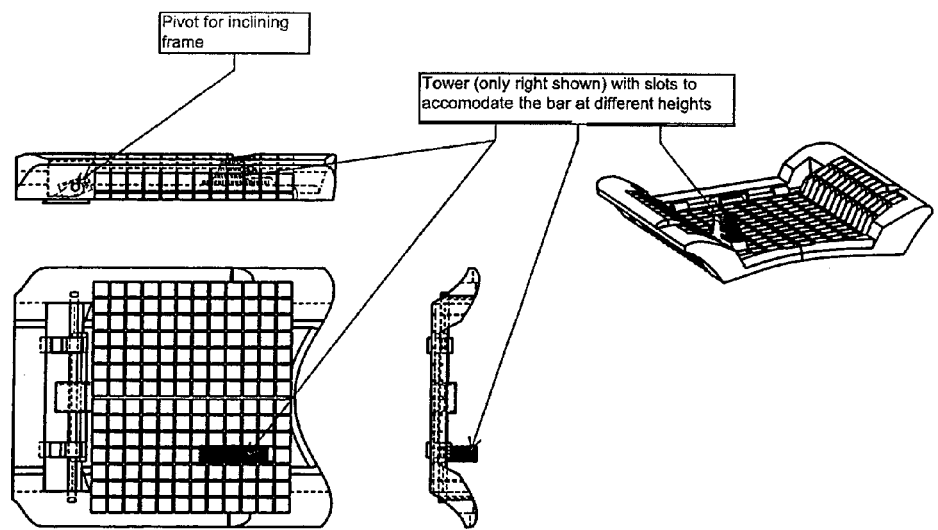

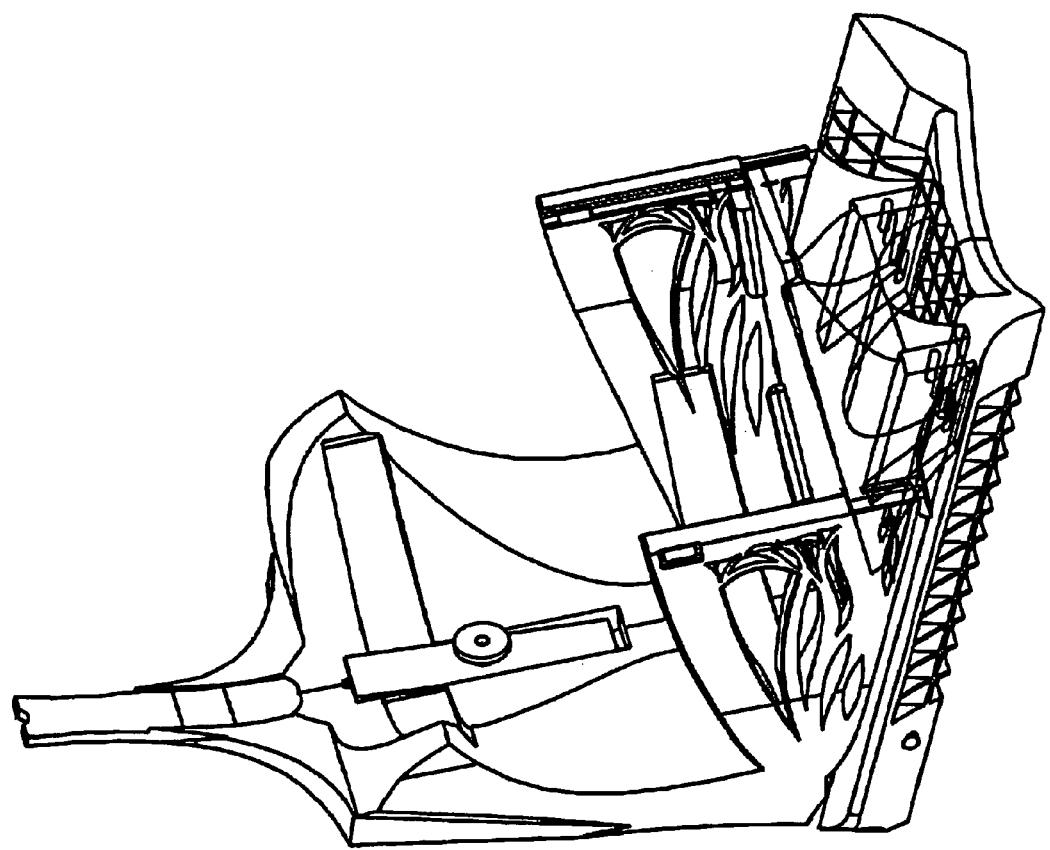
Fig 45 Dynamic Child Seat - Bunge Sling Assembly

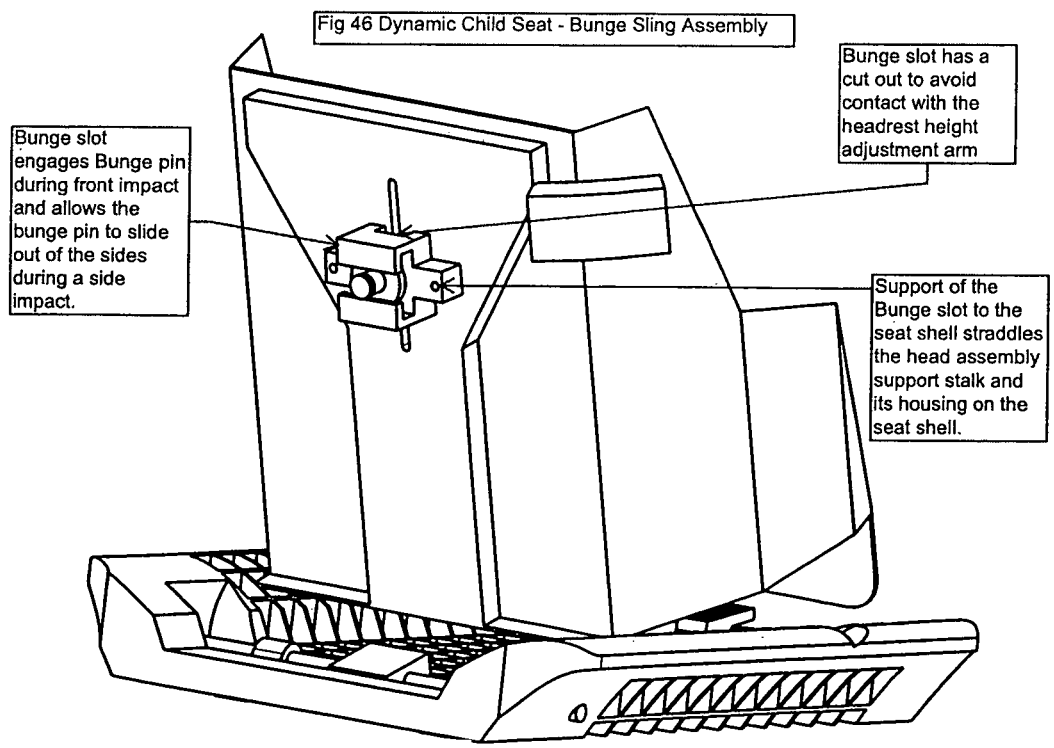

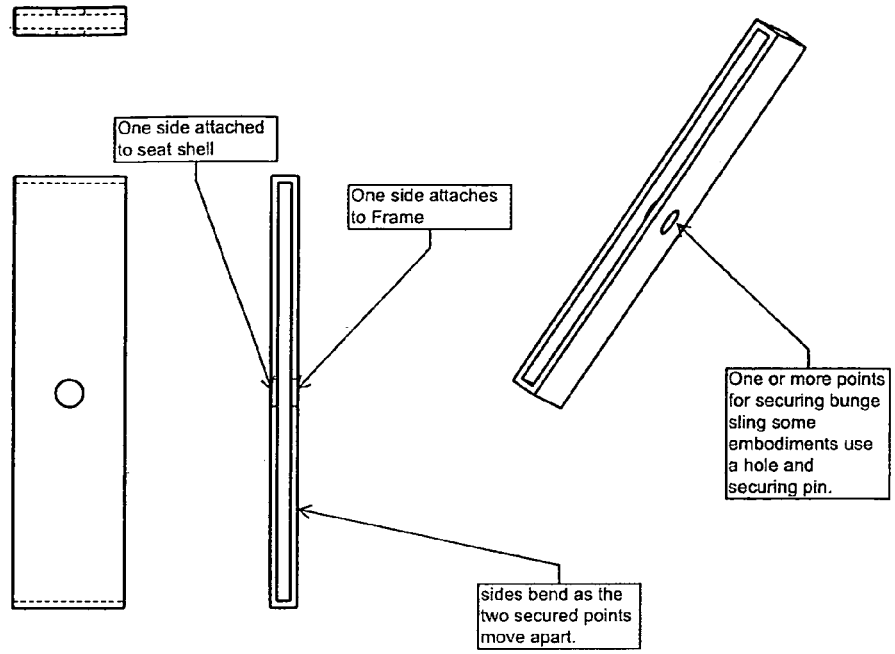
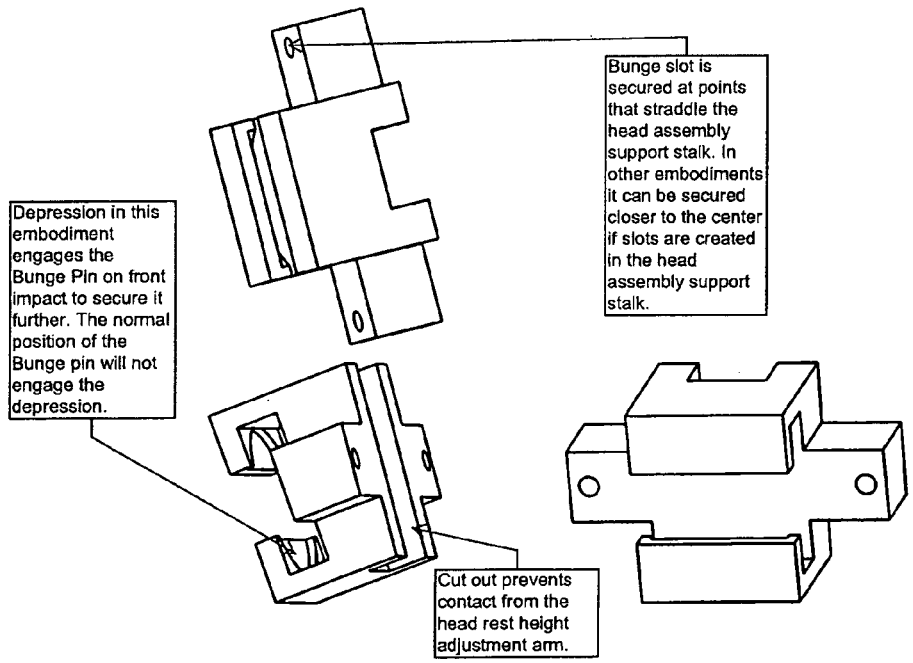

OCCUPANT SUPPORT SYSTEM

REFERENCES

This application incorporates herein by reference and claims priority from the application Ser. No. 11/639,088 (United States continuation-In-part) filed Dec. 14, 2006; 60/928,040 filed May 7, 2007; 60/962,077 filed Jul. 26, 2007; 60/960,067 filed Sep. 13, 2007; 61/066,372 filed Feb. 20, 2008; 60/960,620 filed Oct. 5, 2007; 61/006,074 filed Dec. 17, 2007.

SUMMARY

The Drawings illustrate embodiments of the occupant support systems many of which provide safety and utility in vehicles particularly under dynamic loading conditions. The key attribute of the invention is that the inertial loading of the occupant in the occupant support reorients the occupant support to ensconce the occupant and protect the occupant. It also usually facilitates the deployment of a larger surface area for the support of the occupant thereby reducing the local loading of the occupant surface.

DESCRIPTION OF DRAWINGS

AirSleeper Embodiments

Aircraft and Spacecraft

Figure 1:
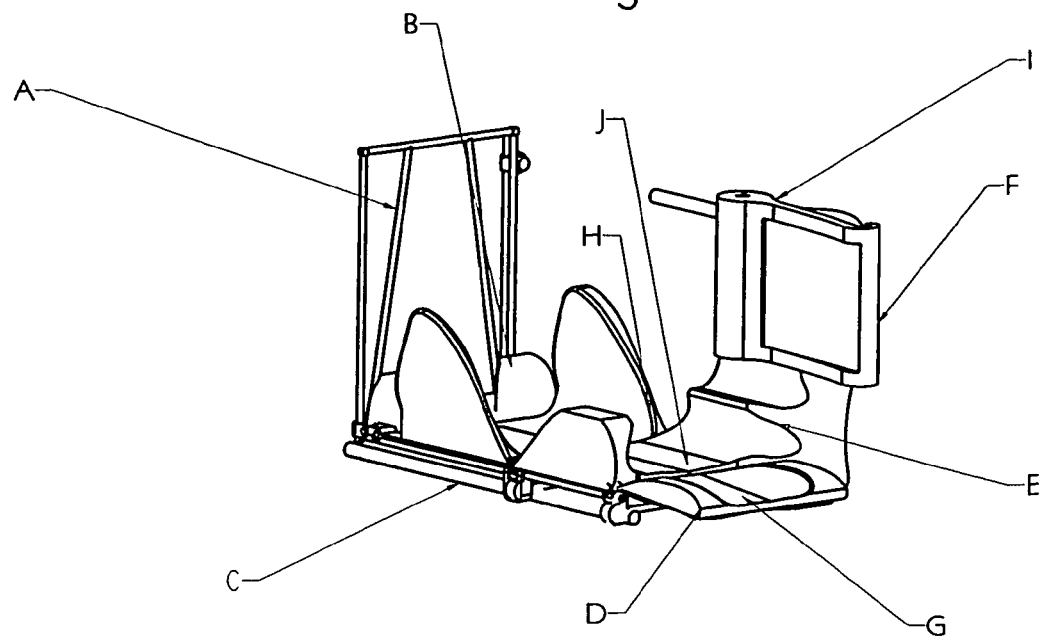
FIGS. 1 and 2. Illustrate an embodiment of the Air Sleeper under normal conditions in the flat bed position.
Figure 2:
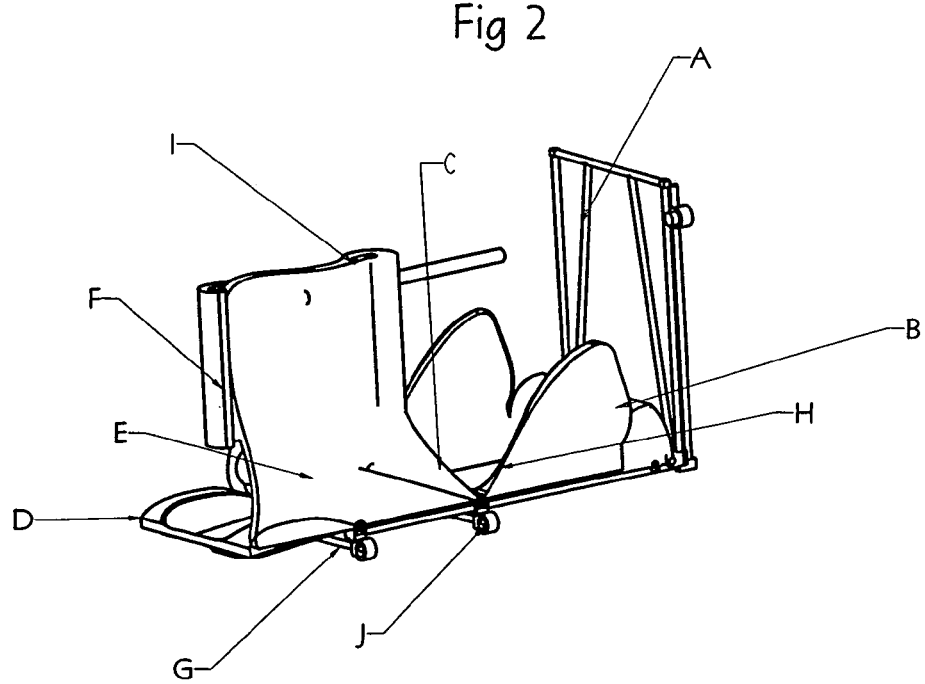
Figure 3:
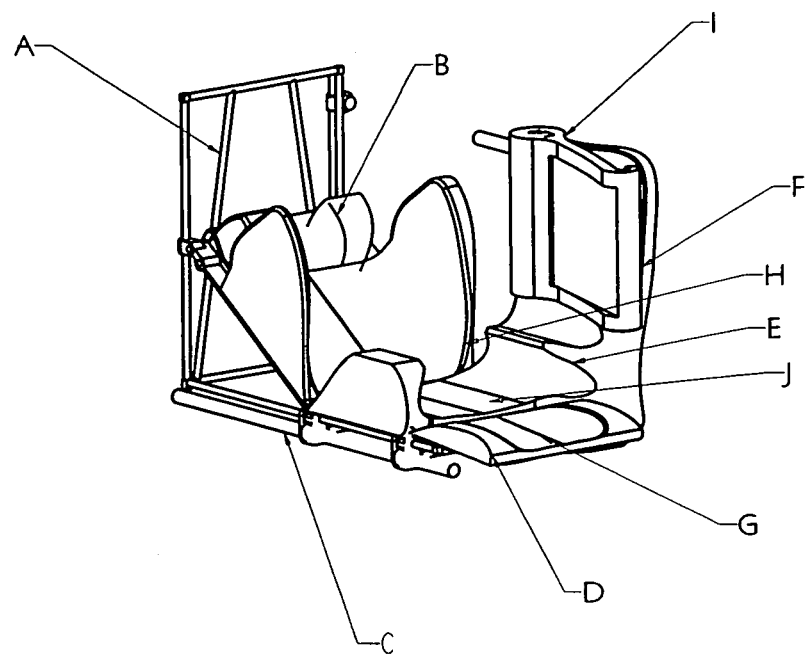
FIG. 3 is in a recline position.
Figure 4:
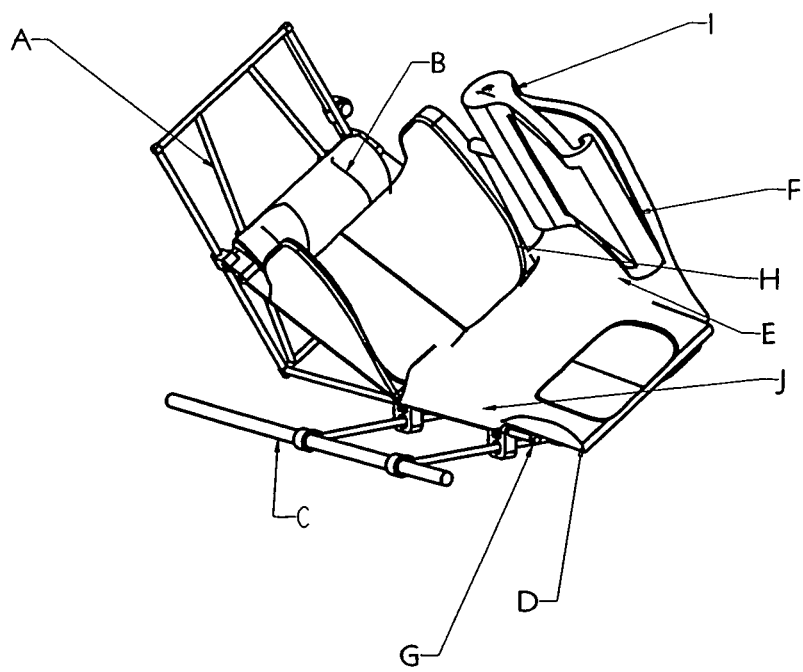
FIGS. 4 and 5 illustrate the impact condition while in the recline position.
Figure 5:
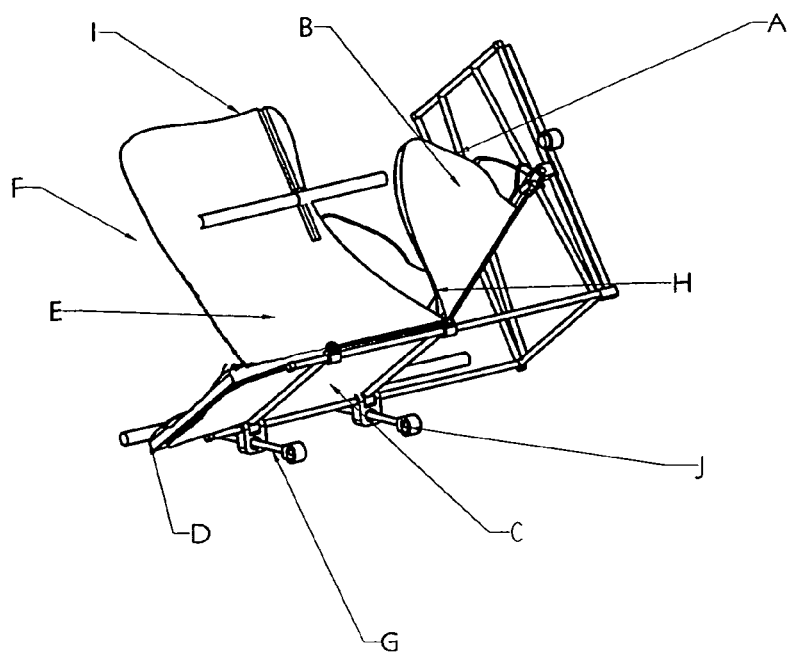

The following key describes the parts of this Air Sleeper embodiment.

A—Head rest mounting rail. This rail is inclined so that as the upper section of the seat slides up the head rest comes closer to the occupant's head, thereby allowing the fine position adjustments on the headrest to position it adjacent to the head to provide support. On the other hand as the occupant lies flat the head rests will slide along the inclined rails to be at the edge of the sleeper surface. The shock absorbers may be adaptive in their resistance parameters to account for the position of the sleeper as well.

B—headrest. The headrest is on shock absorbers that allow them to move sideways relative to the occupants head in the event of a vehicle deceleration. These shock absorbers may be linear or rotational or both. The Shock absorbers are mounted in some embodiments on a rail that is inclined so that when the occupant is flat the head rests are on the side of the sleeper, whereas when the occupant is upright it provides support to the head and is adjacent to the head. There will of course be adjustments for position that are allow motion of the head rest surfaces regardless of the position of the shock absorber and the mounting rail.

C—Support rail below and along edge of the air sleeper and positioned to be rearwards of the Air Sleeper relative to the motion of the aircraft.

D—Lower section of the Air Sleeper is horizontal in the flat position.

E—The mid-section of the Air sleeper has a side wing that supports the occupant in the event of a significant deceleration.

F—An entertainment screen may be installed on the mid-section side wing so that it folds back when not in use. The Dynamics of the Air sleeper are such that the occupant is unlikely to hit the screen head on in the event of a deceleration of the aircraft. It may be folded back and in some embodiments into the side wing of the mid-section. It may also have a rotational stop to prevent forward rotation beyond the orthogonal position to the Air Sleeper.

G—Cross slide that supports the air sleeper mid-section on the right side (of the occupant) in this embodiment.

H—Upper body side support.

I—The pivotal support of the screen ensures that the in the event of a rapid deceleration the support of the screen in the deployed position viewing decouples and it swings on this pivoting axis thereby moving away as from the occupant.

J—Telescoping support rail (through these holes and axial to the occupant but now shown for clarity) supports so the cross slides that move along its axis to flatten the sleeper from the upright position and vice versa. The telescoping action retracts the rail from obstructing the lower section of the Air Sleeper and the legs of the occupant from moving laterally in the event of a deceleration of the aircraft. Ji is the telescoping section of J that will retract as the sliders Q slides towards the head of the Air Sleeper. The retraction is designed to be sufficient to ensure that the foot rest and the legs of the occupant can swing to the side without contacting as the rail J.

Q shows the sliders attached to the ends of the two cross slides that slide on the Rail J.

Figure 6:
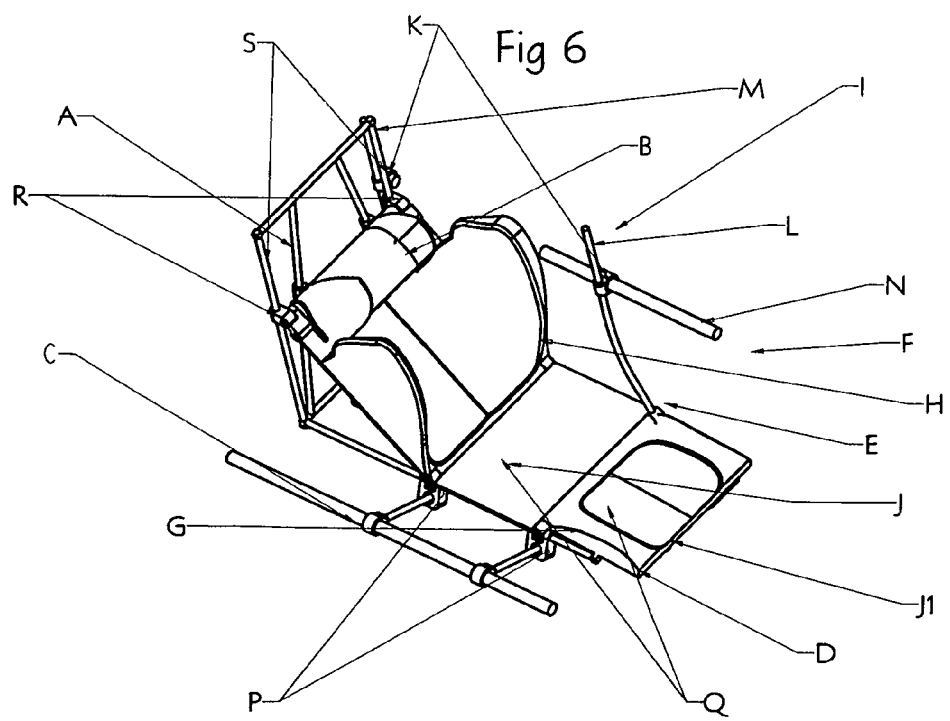
Figure 7:
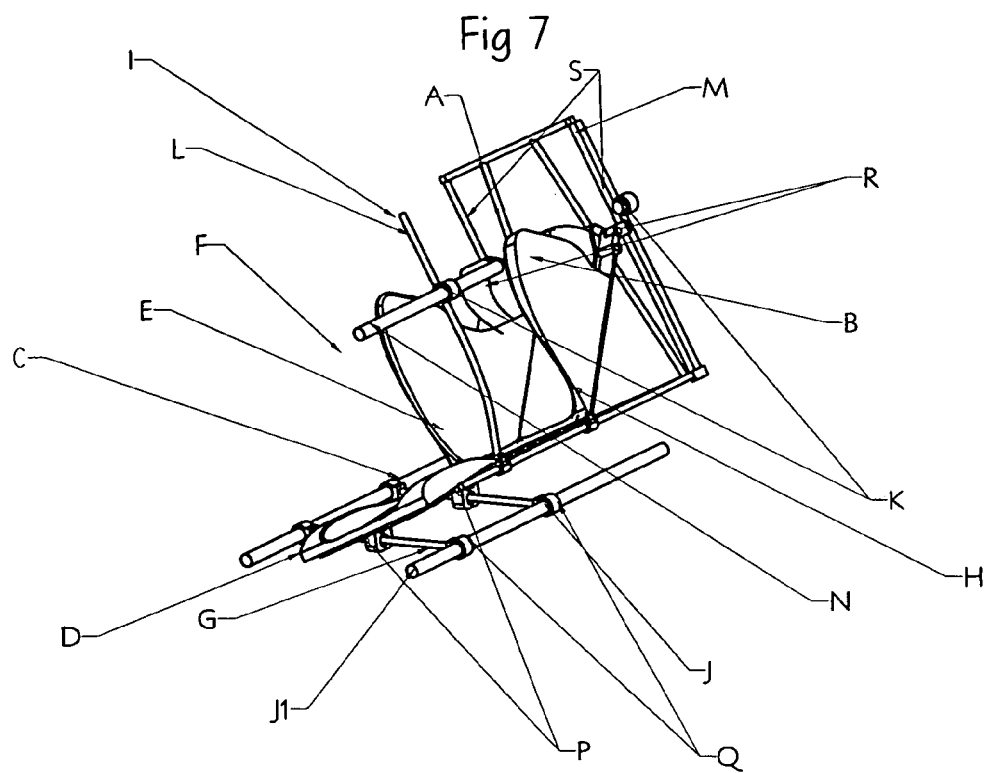

FIGS. 6, 7 show some elements removed for clarity (but identifiers retained in their positions mark these positions)

The double sliders that are attached to the support slide L and M that are part of the AirSleeper frame. The other ends of the double sliders slide on the horizontal rail N as the AirSleeper changes posture. Similarly the sliders P slide on the cross slide G during inertial loading of the Air Sleeper. The slides themselves slide at their ends on the rails C and J as the occupant changes posture. The sliders R are attached to the upper end of the back rest of the Air Sleeper and slide on the slides S that are part of the Air Sleeper frame.

Dynamic Child Seat Embodiments

Figure 8:
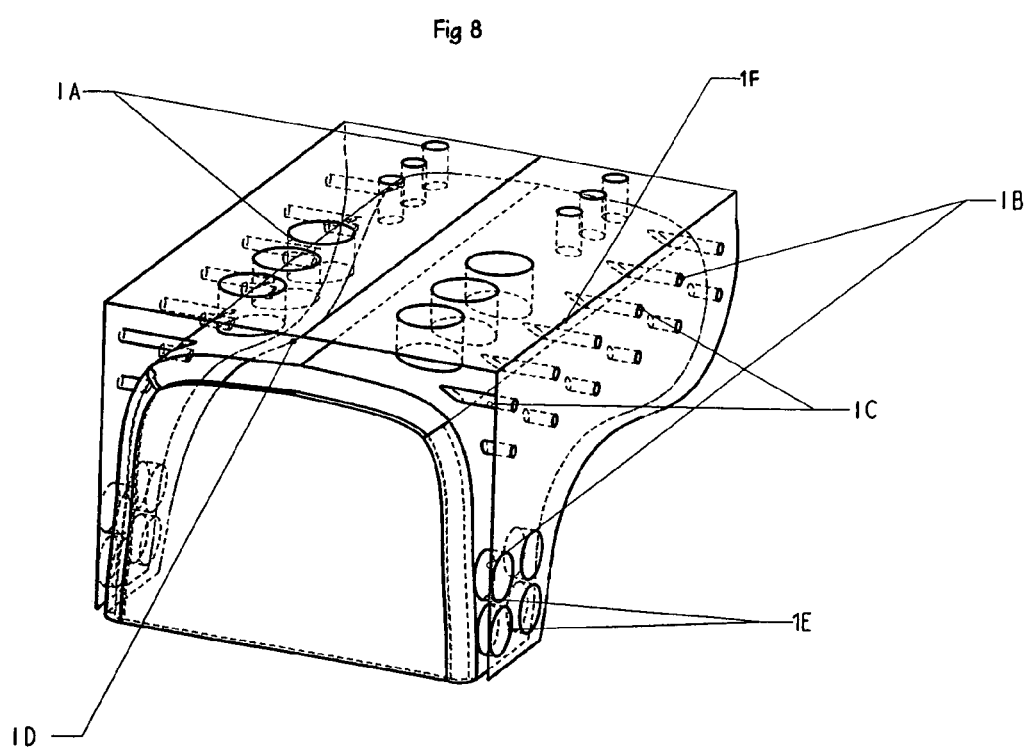
Figure 9:
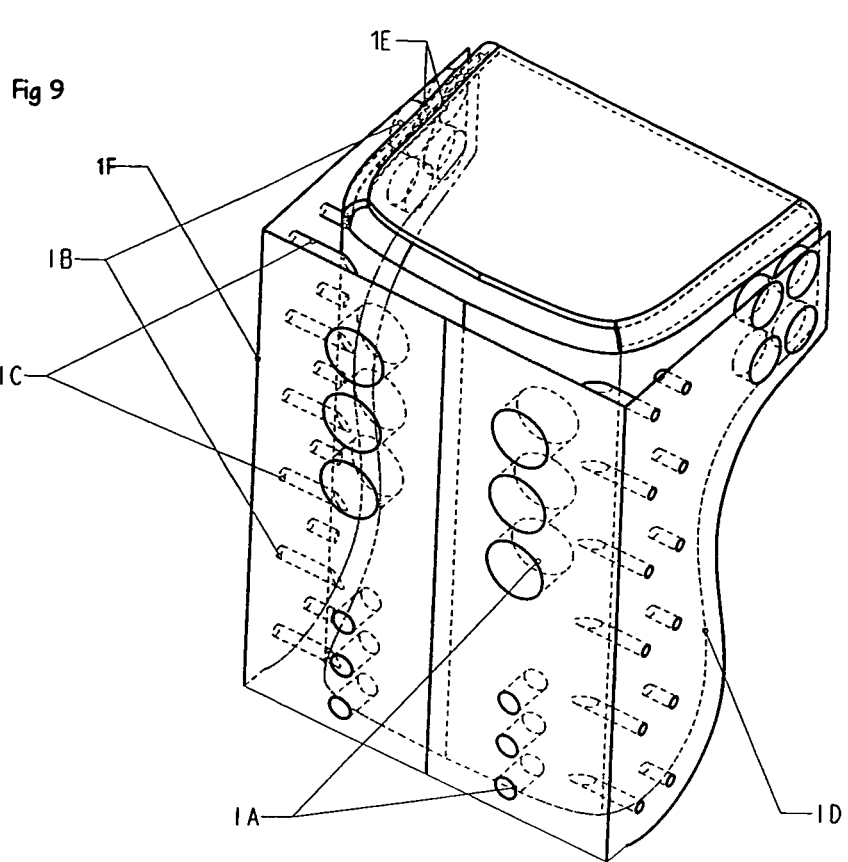

FIGS. 8 and 9 show different views and

Figure 10:
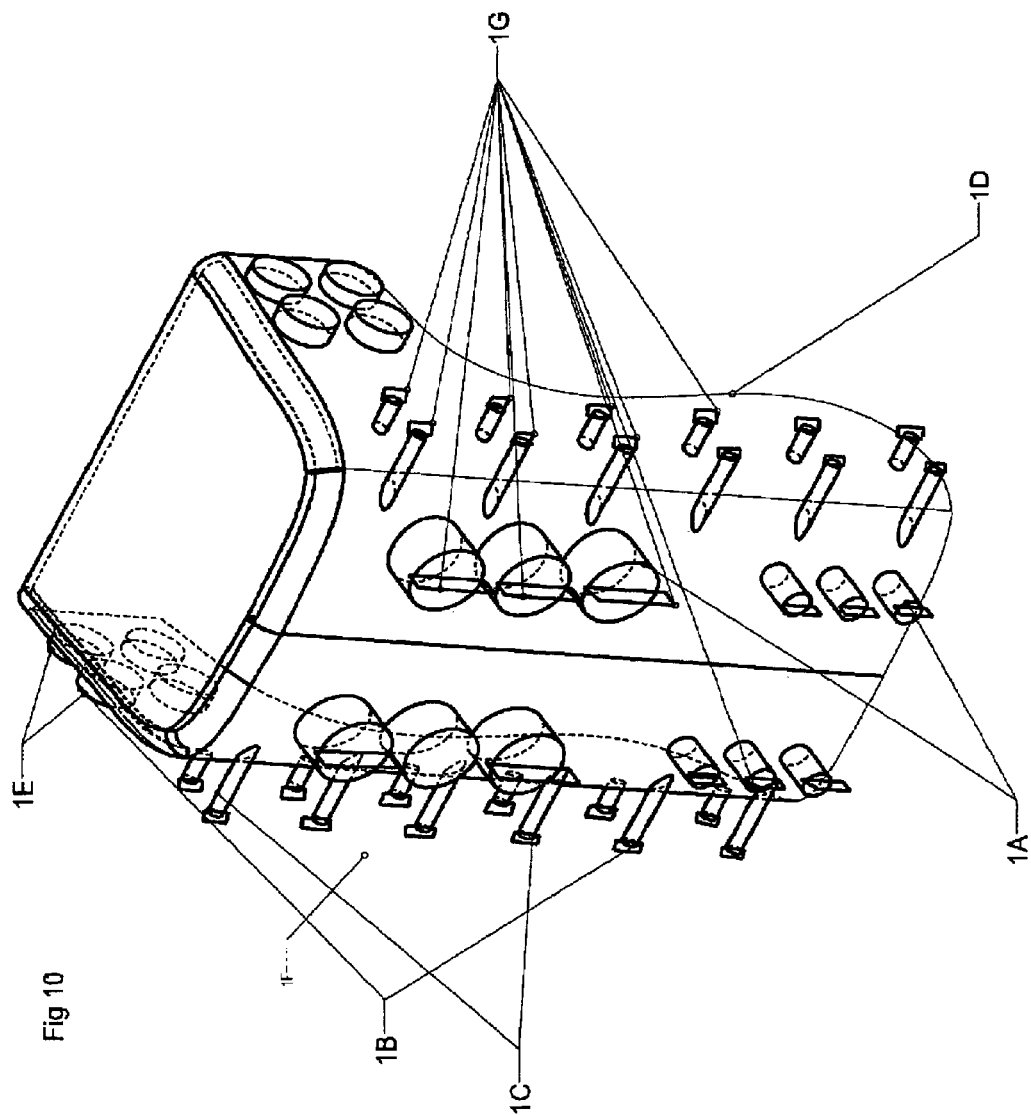

FIG. 10 shows the view without the outer shell.

Figure 11:
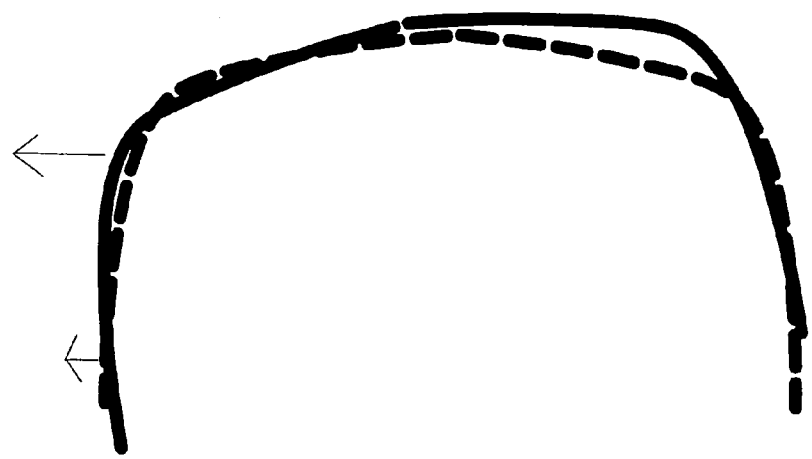

FIG. 11 illustrates the movement under loading.

1A—Shows the cross section difference between the upper and the lower shock absorbers where the width represents the stiffness (they may also be of different materials or construction) to accommodate the whiplash or rear impact or acceleration loadings in a seat.

1B—Shows the cross section difference between the Front and back shock absorbers where the width represents the stiffness (they may also be of different materials or construction) to accommodate the side impact loadings.

Notably in a flat position as in a sleeper that is substantially laterally oriented to the direction of an acceleration, the same principle holds with regard to the "side" impact or acceleration loadings where side still refers to the orientation with regard to the occupant.

1C—Narrow section or softer shock absorber embodiment at back of seat or sleeper.

1D—Inner shell next to body. Moves as shock absorbers deform. May be perforation resistant material.

1E—Broader section or stiffer shock absorber embodiment at front of seat.

1F—The outer shell may have a bottom to provide vertical support for the inner shell. Many embodiments will slidably attach the Inner and Outer shells at the bottom either directly or through shock absorbers. The Outer shell may be rigid or have controlled distortion with loading.

FIGS. 12, 12A, 13, 14 illustrate an embodiment for the head support in another embodiment of a dynamic child seat. This comprises a pair of head pads and a support structure. Considering that there is a large lateral force on the head pads during side impact on the vehicle where the seat is located facing forward or backwards, there is a need for significant strength. Designs to date in the background art use a wide structure that is static. Such a structure obstructs the view and the hearing of the occupant child and more over as it is static can only deform to the extent of padding placed on its inner surface. In contrast the present invention has a narrow head rest support that is located to be lower than eye level for the child in most cases and therefore allows an uncompromised view out of the occupant support as the head pad that may be designed as shown to minimize obstruction of vision. Moreover the structure also allows the head pad to have holes to minimize hearing loss for the child while in the seat.

The low profile of the head rest support is possible because of the wide cross section that can support the shear loading on the member during impact. This contrasts with all designs to date.

The head pads and head rest support are designed as may be seen in these figures to allow the pad to move towards the head rest support during lateral impact. Such movement as may be seen will result in the pads rotating inwards to ensconce the head and prevent it from flying out to hit another surface. The region between the head pads and the head rest support in many embodiments will have a spring damper structure. In some of these embodiments this will take the form of a foam pad that compresses. The front of the head pads may be pivoted or simply supported relatively rigidly by the headrest support.

Finally the head rest support may have a pivotal support at the back if the seat to allow a limited tilt to accommodate the head better during impact. Otherwise it is rigidly attached at the back to the occupant support—the child seat in this case.

Figures 12, 12A:
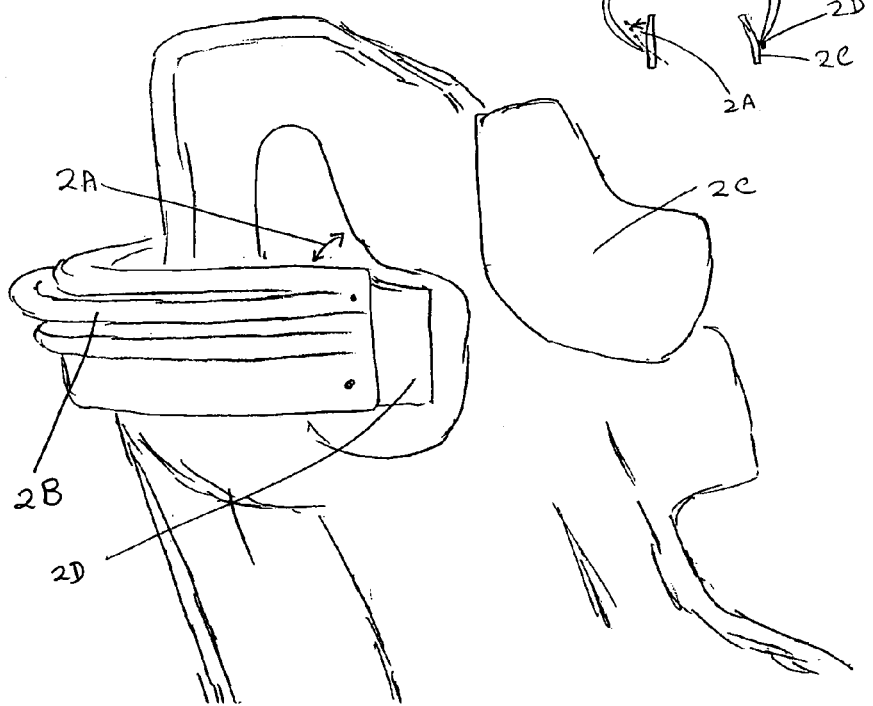

2A—illustrates the space between the head pads and the sides of the Head pad Support which may have foam or other compressible and shock absorbing material with spring damper properties that will allow the pads to fall back into the recess of the support thereby rotating and ensconcing the head. FIG. 12 A shows the motion.

2B—shows the wide profile of the support to resist the lateral forces. Moreover, this wide support reduces the need for a high support that can reduce visibility and hearing for the child. Structurally, the wide support is more efficient in terms of mass and weight of the material of the support and would therefore result in a lighter head support.

2C—illustrates the head pad. It will usually be covered with comfort foam or pneumatic bladder for air support.

2D—Pivotal or stiffer support of the Head pad towards the front edge of the head pad.

2E-Holes to reduce hearing loss on headpads. Notably as the headpads are supported by the Headpad Support and are therefore do not have critical structural strength requirements and can be fabricated to be thin. The space between the Headpad and the Support allows sound transfer.

2F—the upper edge of the Headpad is shaped to be below the eyes of the occupant to minimize visual impairment.

The following figures show an alternative embodiment for controlling the motion of an inner, movable shell for the occupant.

FIGS. 15 and 16 show the "flex plates" that are an embodiment of the lateral spring dampers or shock absorbers. These are designed to flex during a lateral impact to absorb energy from the movable inner shell. The flex plates are rigidly mounted on one end to the outer shell (in this embodiment the framework of the outer shell) and are attached at the other end to sliders that slide on slides attached rigidly to the inner shell.

The Figures show fixed and movable slide plates that are attached respectively to the fixed outer shell and to the movable inner shell. They are pivotally attached at the front end of the seat to allow sliding motion. The pivot at the front of the seat allows the seat to rotate during side impact to maximize the lateral displacement of the head thorax and pelvis. Notably the slide plates apply a moment and a lateral force on the seat thereby balancing the forces applied by flex plates along the height of the seat. The background art does not have embodiments with a front pivot with this required compensation with sliding arrangements.

FIG. 16 shows the slides that are attached to the inner shell. A, B, C, D. These engage the sliders on the Flex plates to allow the seat to rotate and the back if the seat to move laterally during impact loadings.

FIG. 16 also shows a shoulder brace that ensconces the shoulders during a lateral impact.

FIG. 17 shows the slide plate on the movable inner shell and also the locations for the slides attached to the inner shell.

FIG. 18 shows the slide plate on the inner shell.

Notably the slide plates as shown in the above figures are designed to flex or bend about the pivot (about a lateral axis) in the event of the front impact thereby allowing the head of the seat to move forward.

2G—illustrate the Flex Plates. These are made of a flexible material that has spring damper properties. Some embodiments may have layers that have flexible and deforming materials to absorb energy. The Flex Plates are rigidly attached to the outer shell and are slidably attached to the inner shell.

2H—illustrates a fixed slide plate on which the movable shell slides.

2I—is the pivot or axis for the seat. The axis alone cannot effect the angular movement of the seat as the loading is substantially above the location of the pivot point. The pivot in some embodiment may be a bolt in a bearing sleeve.

2J—Slides that are rigidly attached to the inner shell.

2K—Shoulder brace

2L—Slidercontact supports attached to the Flex Plates.

2M—Rigid mount for Flex Plates on the fixed shell.

2N—Slide Plate on the movable inner shell.

FIG. 19 shows an arrangement for some embodiments for front impacts. Considering that it is preferable to have a lower peak acceleration of the head and upper body of the child in the child seat/occupant support, the "Bunge Sling" is designed to flex or bend to absorb energy and reduce the peak acceleration during a front impact. This along with the slide plates bending or flexing about their pivot will allow the seat and the thorax and head of the child to project forward during impact thereby reducing the peak acceleration. This is the first such design using a moving inner shell attached with flexible or damping materials. The Bunge Sling may be made of layers of materials that deform and those that flex to get the right combination for the spring damper properties. Other embodiments may also use the Bunge-Sling as noted herein.

2P—Fixed Outer Shell

2Q—Movable inner shell

2R—Bunge Sling (Opened under impact conditions.)

The Bunge Sling may be made of strips of flexible material or of materials that will go beyond their plastic state and bend or a combination of both to get the right spring damper properties.

FIG. 20 shows features related to the embodiments of FIG. 7-10. Here the "support for the inner shell" may be of a soft material such as foam, but are designed to support the inner shell to the outer shell during normal operation and either flex or detach to allow the inner shell to move as needed under impact conditions. Some embodiments may have the length (l) of the supports greater than the width (w) such that if they detach and fall over they facilitate a space between the inner and outer shells.

Figure 21:
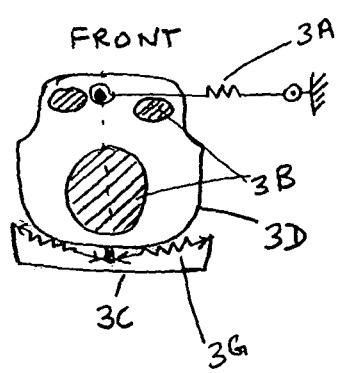
Figure 22:
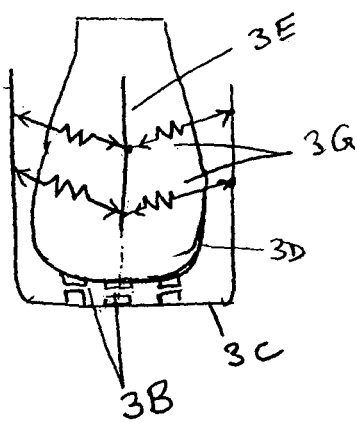

FIGS. 21, 22 show yet another embodiment—Bottom view and back view respectively, with compression shock absorbers at the back with the required angling to counter the couple resulting from the position of the center of mass of the child and support relative to the supports. It also shows the connection means with sliding elements at the bottom and a connection means with at least one pivot and a rigid or shock absorbing element.

Figure 23:
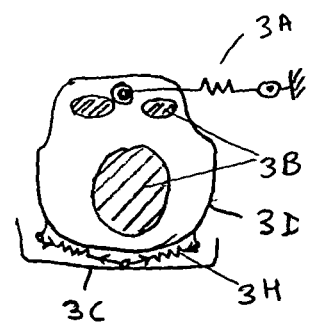
Figure 24:
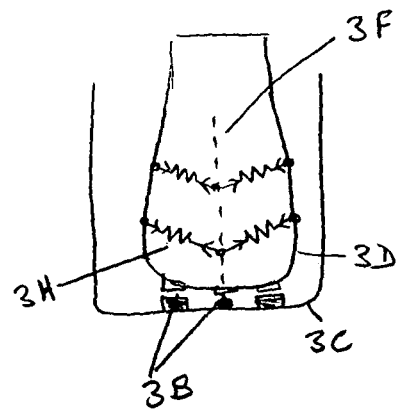

Similarly the FIGS. 23, 24 show tension shock absorbers at the back with the angling instead of the compression shock absorbers as in FIG. 21, 22.

Figure 25:
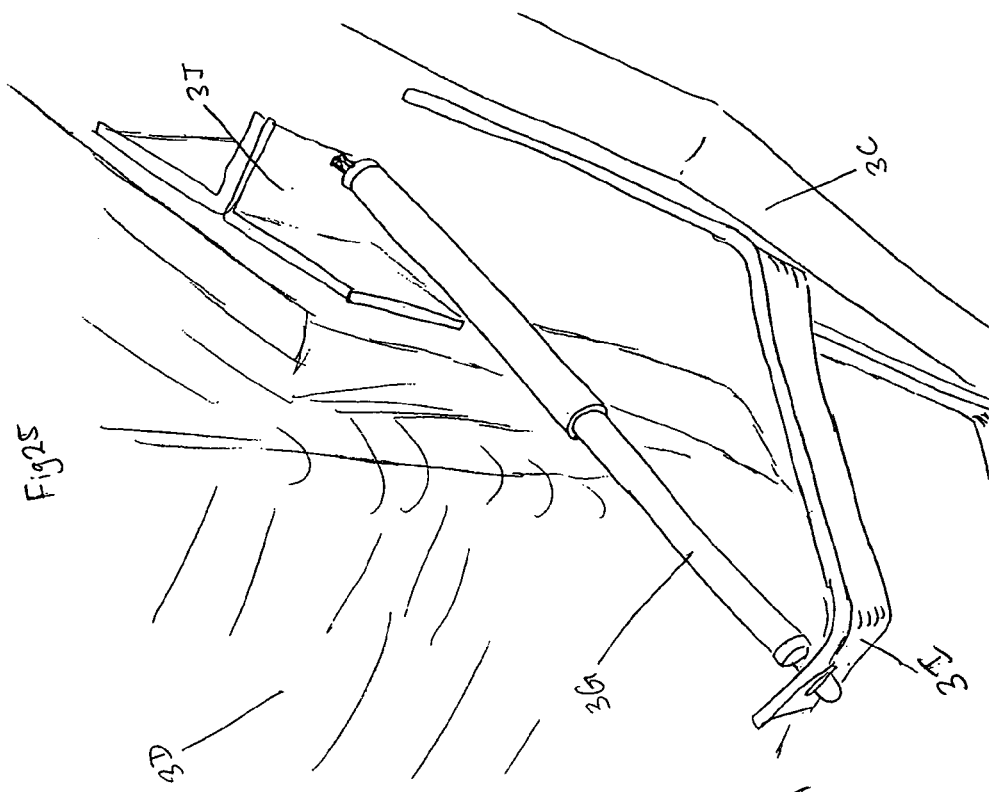
Figure 26:
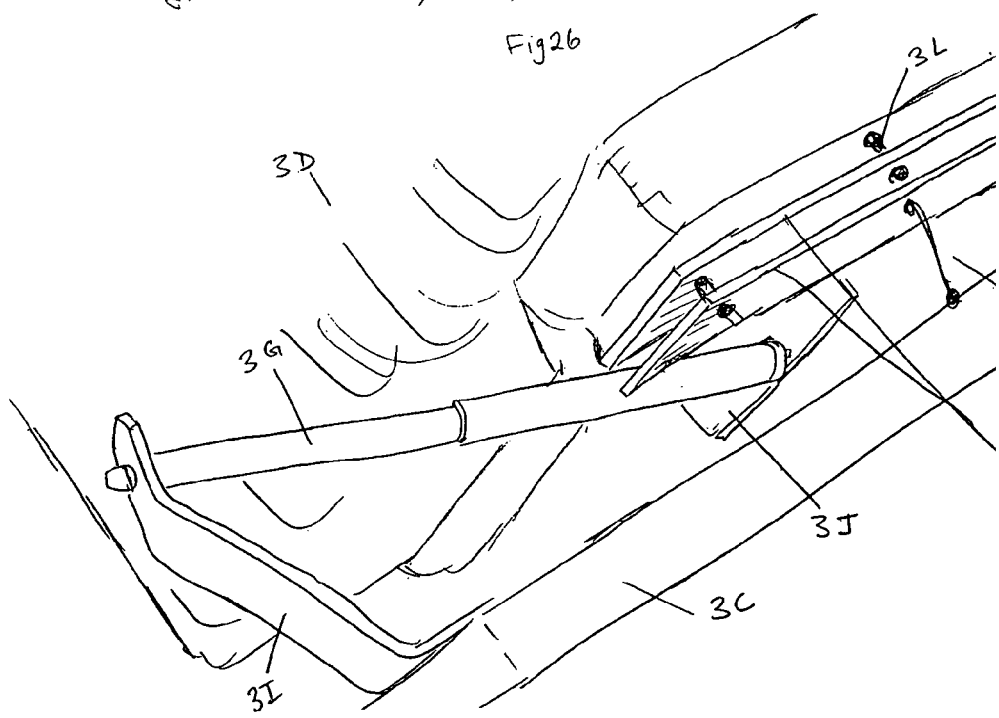

FIG. 25 shows implementation of the compression shock absorbers in FIG. 21, 22 and FIG. 26 an embodiment of the bunge sling for front impact—an additional connection means with a shock absorbing element.

3A—Connection means with at least one pivoting end and a rigid or shock absorbing connection there between. Connected at one end to the inner movable shell and at the other to the fixed outer shell. This may take the form of a spring loaded pivot or simply a pivot.

3B—Sliding contacts between the fixed outer and moving inner shells.

3C—Outer shell or frame

3D—Inner Shell

3E—RearSpine fixed to the Inner movable shell

3F—Rear Spine fixed to the Outer fixed shell

3G—Compression shock absorbers (spring dampers)

3H—Tension shock absorbers (spring dampers)

3I—Bracket holding compression shock absorber to the fixed outer shell

3J—Spine holding compression shock absorber to the movable inner shell.

3K—Connection of Bunge-Sling to the Fixed frame or shell

3L—Connection of the Bunge Sling to the movable inner shell.

Figure 27:
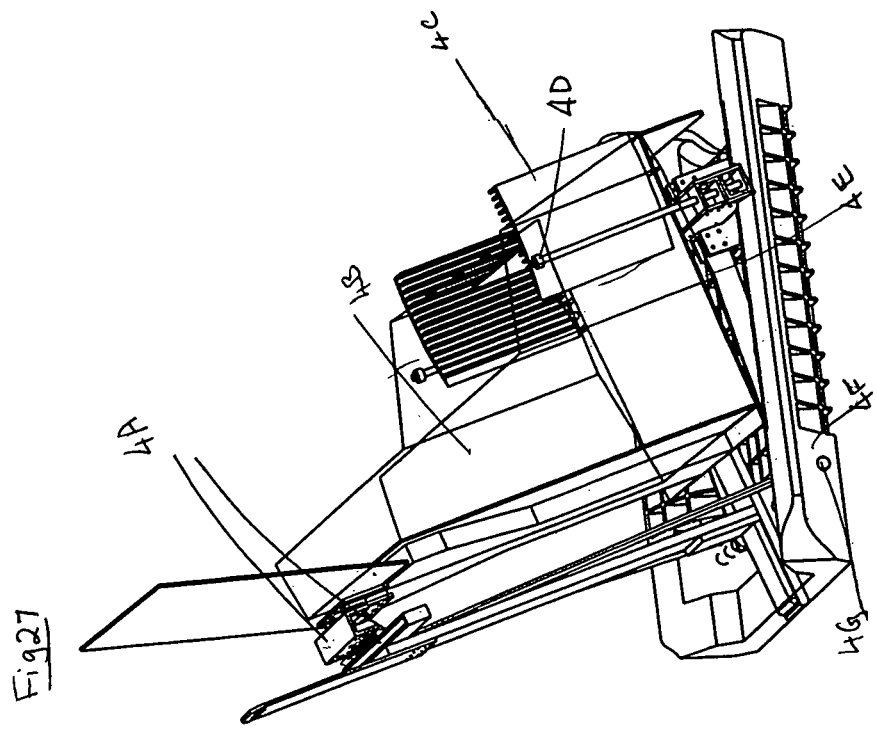
Figure 28:
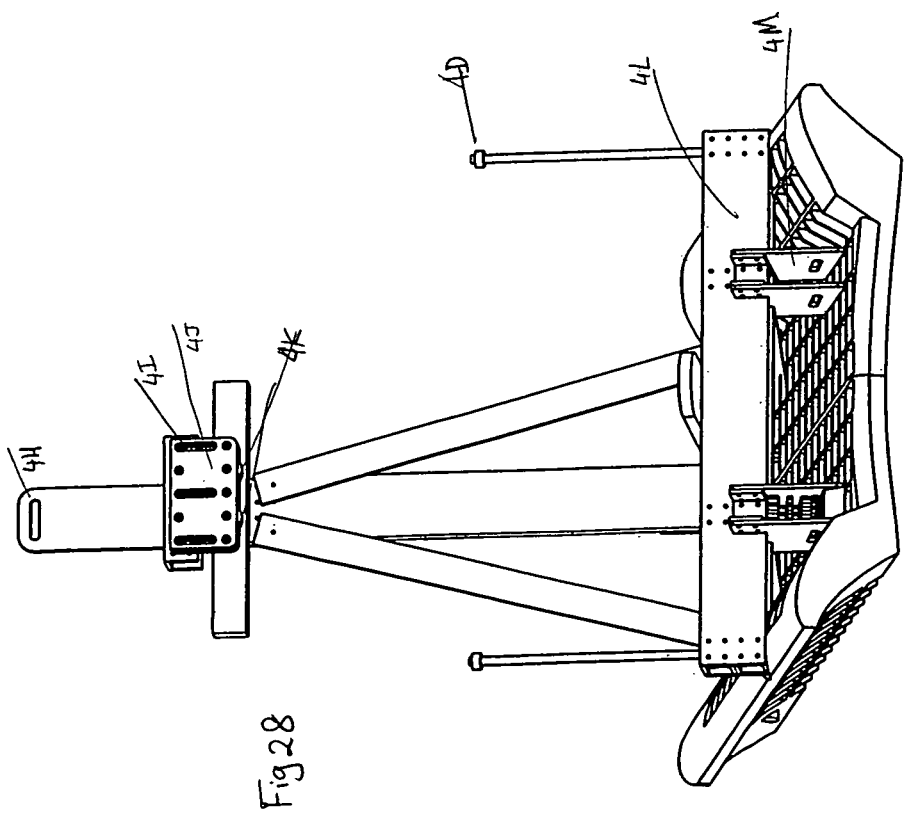
Figure 29:
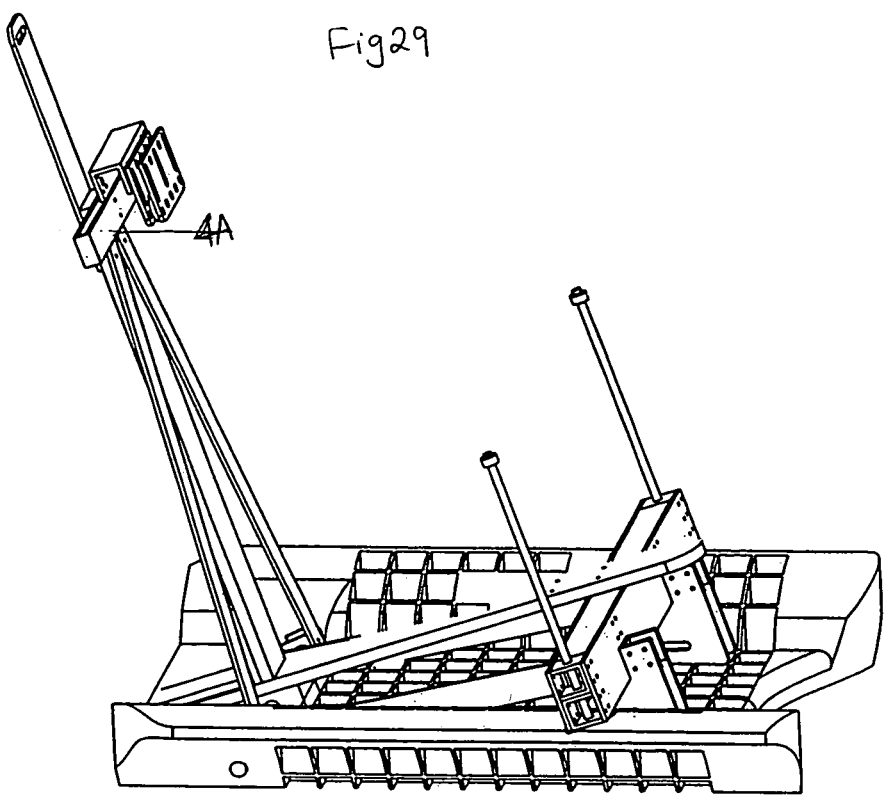

FIGS. 27-29 show another embodiment of an occupant support for a child in a vehicle.

The annotations describe the operation and use of its parts.

4A—Bunge Sling that allows the seat to move forwards in a front impact. One side is firmly attached to the frame, the other side is attached to the support of the vertical thrust bearings as shown.

4B—Moving Seat

4C—Reaction surfaces on moving seat guides fixed bearings. The surface may have a groove that accommodates a sliding pin to ensure that there is limited vertical "lift" of the moving seat as it slides.

4D—bearing positioned to be as close to the vector of inertial loading (passing through the center of Mass) in a lateral impact.

4E—Sliding surface of seat bottom

4F—Base with pivot at back to allow rear facing deployment. Support Flanges (4M) can be set at different levels for changing the inclination of the seat.

4G—LateralPivot axis for fixed shell or frame.

4H—Tether Loop

4I—Slot with spring dampers that can control the movement of the bearing (4K)

4J—Vertical reaction bearing support with slots and spring loading to accommodate pulse loading at impact.

4K—Bearing (ride on groove on back of moving seat)

4L—Lateral Brace supporting reaction bearings

4M—Support flanges can be locked at different positions on gear (not shown) on base for rear facing deployment at the required angle.

FIG. 35 Shows embodiment of a dynamic child seat. The position of the seat shell is during impact and is shown rotated away from the side impact direction. It also shows the placement of the frame on the base and the notch that engages the frame for lateral stability. The pillow pads that support the head laterally and the rear head rest are not shown but the rotated positing of the seat she shows the left side arm of the head assembly ensconcing the head in the impact position.

FIG. 36 shows the embodiment of the dynamic child seat with the attachment to the tether marked and the slide bar shown with one or more pins that engage a sliding surface on the seat shed to allow rotation about the impact rotation axis. The pins (not shown) (which may be spring mounted) limit vertical motion of the seat shell. It also shows Pairs of feet on either side support the frame in front. A lateral bar (not shown) engages the slot shown and is spring loaded to be in the rear position of the slot normally in can be drawn forward manually to the front of the slot to disengage one of the multiple slots in the two towers attached to the base thereby changing the height of the front of the frame and the resulting inclination. And the pivot for linking the seat frame particularly in the rear facing position.

FIG. 37 shows the dynamic child seat frame. The Upper and lower channel shown house spring damper assemblies—one on each side.

The Upper edge of one or both the channels that support the spring damper assembly has a slightly inclined top surface with a lower front edge so that when the pin or flange attached to the seat and supporting the Spring damper assembly rises on the side away from the impact it is captured by the slot preventing a rocking of the seat and channeling the energy to rotation about a near vertical axis. Also shown is the slot that houses a front brace that has a sliding surface and a pin both of which ride on a sliding surface coaxial with the impact rotation pivot shown. The pin engages the slot in the surface to prevent vertical motion of the seat at its edge during impact. This pin may be spring loaded to return the impact energy if raised, to the seat for its rotation. Also shown is the Pivot-impact rotation axis that may have a spring mount to allow a short axial displacement for redeploying the initial impact loading that can tend to rotate the seat about a horizontal axis.

FIG. 38 shows the end of the upper channel that provides the reaction surface for the spring damper assembly during rotation of the frame following side impact.

FIG. 39 shows the cavity for metal reinforcement that is an extension to the tether support. The metal strip extends in this embodiment to wrap over the lower pivot hinge. This provides a rigid connection between the tether and the pivot rod at the bottom that is connected to the latches.

FIG. 40 Dynamic Child Seat-Headrest Height Adjust Arm.

1. The actuation lever in the normal position will be away from the back of the head assembly support stalk and be depressed towards the head rest support stalk to disengage the pins and move the head rest.

2. In other embodiments, with the pins located between the actuation lever and the pivot the normal position of the actuation lever will be next to the head assembly support stalk and be pulled out to disengage the pins.

In case 1. above a safety catch can be created (either pivotally or slidably attached to the stalk or the lever to fall between the stalk and the lever and color or marks indicating this position for safety, In case 2. A safety catch may be pivotally or slidably attached to the stalk to capture (with a loop) the lever for the safe position coding being visible.

The Pivot for the height adjustment arm would usually be spring loaded to engage the socket holes in the normal position. The pivot in this embodiment is on the head assembly support stalk. However it may also be supported on the seat shell with multiple sets of holes on the head assembly support stalk to allow different heights.

The Actuation lever is shown.

Pins engage corresponding holes in the head rest support stalk to which the height adjustment arm is attached. It also engages multiple sets of such holes on the sheath on the seat shell containing the head assembly support stalk, thereby allowing multiple positions for the height of the seat support stalk on the seat shell.

FIG. 41 Dynamic Child Seat-Head Assembly support stalk. Shows:

Pivot for attachment of the headrest height adjustment arm

Pivot support for attachment of the rear head rest. The rear headrest is pivoted to allow greater conformity with the rear of the head and neck.

The ends of the side arms support the pillow-pads (not shown) that provide lateral support for the child's head and face. Many embodiments allow the attachment to be pivoted about a substantially vertical axis so that it can tilt back on side impact thereby containing the head.

Pin holes (not shown) will be arranged in a line to accommodate the pins on the headrest height adjusting arm. These same pin holes will engage multiple sets of holes on the sheath at the back of the seat shell to allow multiple positions of the Head Assembly Supports stalk on the Seat shell.

FIG. 42 Dynamic Child Seat-Seat shell assembly. Shows:

Pins that may engage one or both sides of the sheath on the seat shell housing the head assembly support stalk.

Inner edge of spring damper assembly which is secured to the seat shell. Some embodiments have a flange that engages the slot on the frame with a small clearance.

Headrest height adjustment arm

Position in some embodiments of the right spring damper assembly. Similar assemblies will be on the left and at the lower position as indicated on the frame.

Head assembly support stalk

FIG. 43, 44 Dynamic Child Seat Base, Shows:

Notches that capture frame in lowest (front facing) position

Pivot for tilting the frame when seat is in the rear facing position

Pair of towers with notches that engage a lateral bar on the frame for different inclinations of the frame on the base. The frame will pivot on the rear Pivot Sides beveled for car seat shape FIG. 45 Dynamic Child Seat—Bunge Sling Assembly. Shows:

The Bunge Sling that stretches out on front impact to damp acceleration. Rear center of Bunge sling is attached to the frame.

The Bunge Pin that slides inside Bunge Pin Slot attached to seat shell. On side impact the pin slides out. On front impact the pin engages the slot to provide a reactive force. Some embodiments of the slot have a depression on the inner surface of the slot that the pin will move into on motion of the slot forward on front impact, thereby securing the pin further in the slot.

FIG. 46 Dynamic Child Seat-Bunge Sling Assembly. Shows:

Bunge slot that engages Bunge pin during front impact and allows the bunge pin to slide out of the sides during a side impact.

Bunge slot has a cut out to avoid contact with the headrest height adjustment arm Support of the Bunge slot to the seat shell straddles the head assembly support stalk and its housing on the seat shell.

FIG. 47 Dynamic Child Seat-Bunge Sing. Shows:

Each of the two side that in their center attach to the frame and the seat shell respectively.

One or more points for securing bunge sling some embodiments use a hole and securing pin.

The sides of the Bunge sling stretch out as the two support points are pulled apart. The materials are designed to provide energy absorption and elastic properties to minimize injury for the occupant.

FIG. 48 Dynamic Child Seat-Bunge Slot. Shows:

The depression in this embodiment engages the Bunge Pin on front impact to secure it further. The normal position of the Bunge pin will not engage the depression.

Support points on Shell. Bunge slot is secured at points that straddle the head assembly support stalk. In other embodiments it can be secured closer to the center if slots are created in the head assembly support stalk. Cut out prevents contact from the head rest height adjustment arm.

DETAILED DESCRIPTION OF INVENTION

The present invention provides an architecture to reorient the occupant in a vehicle support to present a larger surface area for the reaction force to be distributed, thereby causing less injury and in the case of moderate loadings greater comfort. The architecture works equally well for the seat or a sleeper and all positions between the two. It also applies to architectures that have a variable orientation from sleep position to sit up position. It can be used in infant and child supports in cars and also in sleepers in vehicles including aircraft.

Vehicle Occupant Support—Air Sleeper.

The embodiment of the Air Sleeper presented is supported on a frame. This frame is designed to tilt as the occupant of the AirSleeper experiences a lateral or near lateral (angled) inertial loading—often in crashes. In the event of the orientation of the AirSleeper being orthogonal to the axis of the aircraft there is a direct inertial loading on the occupant support that causes the tilting. If the Air Sleeper is at an angle to the axis of the aircraft, the component of the inertial loading forces in the plane of the two slides cause the movement.

The slides will usually have spring dampers to optimize the acceleration experienced by the occupant ion this transition.

The tilting is achieved by sliders P on cross slides G that relocate the rear (with regard to motion of the aircraft) edge of the AirSleeper forwards (relative to the motion of the aircraft) and a set of slides L, M that are attached to the AirSleeper frame and on which sliders K ride. Notably, the sliders K and the and the cross slides G need to take different positions as the occupant moves from a upright seated position to a reclining position to a flatbed sleep position. This is achieved by having:
1. The cross slides G attached to sliders Q that can slide along the rails C and J that are along the axis of the occupant. Notably Rail J as a section J1 that collapses (telescoping) as the sliders Q move up the rail. This is necessary to allow the legs of the occupant and the footrest of the air sleeper to tilt sideways without contacting the rail when under lateral inertial loading.

2. The sliders K to be double slides that can also slide on rail N along the axis of the occupant. Many embodiments would only require one of these double sliders. In the embodiment shown the slider K at the head of the occupant simply pivots on a point support.

3. Having spring damper combinations on one or more of these linkages to control the acceleration of the occupant.

The discretionary position of the occupant is controlled with the sliding of the sliders Q on the horizontal rails and the sliding of the sliders R on the slides S that are part of the Air Sleeper frame. The slides S are shown to be near vertical in the normal position of the Air Sleeper but they can take any inclination as long as they are locally parallel with each other. The local inclination of the slides will define the discretionary postures that the occupant can choose.

The Side support head rests in the embodiment shown (some embodiments will not have such a headrests) slide on inclined slides and a lateral slider that rides on a lateral slide on the top of the seat back. These mechanisms allow each of the side support head rests to move towards the head in the seated position and move to the edge of the Air Sleeper in the flat bed position.

The support surfaces of the Air Sleeper are below and on the forward side (with regard to the motion of the aircraft).

The orientation of the air sleeper may be lateral to the aircraft or angled to the axis of the aircraft. If in an angled position the head of the occupant is ahead of the feet (in the direction of motion of the aircraft), the occupant will be pushed into the Air Sleeper on impact loadings.

The screen is shown to have a vertical pivot (in the normal position of the occupant i.e. without inertial loading). Notably the arrangement ensures that the screen swings away from the occupant in the event of a crash or rapid deceleration. This can be ensured by having a rotation lock that prevents forward swing past the lateral orientation. If the AirSleeper is oriented to have the feet of the occupant ahead of the head (in the direction of the aircraft) on impact loadings the screen will swing away from the occupant. If the head of the occupant is ahead of the feet the screen can have a stop to prevent swinging forward towards the occupant.

Vehicle Occupant Support—Dynamic Child Seat

There are multiple alternative embodiments of the Dynamic Child seat version of the present invention. The first set of embodiments of the present invention are related to the inventions of U.S. Ser. No. 10/109,674 and EP 1325836. They relate to inertial loading of the occupant and its support substantially lateral to the occupant and offer a solution for reduction in injury with controlled reorientation of the occupant. This family of embodiments use a plurality of connection means to support the occupant support shell. The plurality of connection means each have a first end that is attached to the occupant support or an appendage to the occupant support. The plurality of connection means are designed to relocate these first ends in a plurality of directions thereby reorienting the occupant in the occupant support when under an inertial loading caused by an acceleration of the vehicle. The distance and direction of displacement of the first ends may vary among the plurality of connection means.

This paradigm for support provides a mechanism to provide controlled reaction forces in positions that can control the rotation and relocation of the occupant under the expected range of inertial loading conditions.

Some such embodiments may be as disclosed in 60/962,077 wherein the plurality of support means are flexible "fingers" of foam or other deformable material with the connection means including a sliding arrangement at one of the ends of the fingers in some cases. These embodiments will allow compression of the foam (which may have differential properties and/or cross section to vary the compression and resulting displacement) and distortion of the foam in some cases to relocate the first ends of the connection means orthogonal to the length of the "fingers". While the notion of fingers is helpful for visualization there is no limit in these embodiments to have separate fingers. For example there may be a continuous foam support that has varying properties that effectively provide a plurality of connection means as well, as each of the sections of foam act differently on the support shell and occupant with their first ends relocated in a plurality of directions.

Another group of embodiments may be as disclosed in 60/960,067. These embodiments multiple sliding connection means some with shock absorption means that relocate their first ends under controlled reaction forces from the occupant support shell at suitable locations, such that the occupant and occupant support is suitably relocated under inertial loading.

Another group of embodiments in this invention with a plurality of connection means with first ends that relocate the occupant support in a plurality of directions by providing controlled reaction forces in suitable locations on the occupant support to counter the inertial loading in a controlled manner. In these embodiments are discrete elements one or both of pivoted at the ends and a reaction force applied in the direction between the first and second ends (compressive or tensile) of the connection means. These connection means may each have shock tension or compression absorbing elements in them. The mechanics of the invention will require that if there are more than one connection means with a single pivoting end at any time they must have the same single pivoting axis.

Yet another group of embodiments may have a combination of two or more of the above types of connection means to relocate the first ends in a plurality of directions.

One of the challenges in designing the appropriate occupant supports is to locate the two first ends of the connection means to define the instantaneous axes for rotation and relocation of the occupant. There is of course never access to points of support in the interior of the occupant and in many cases the front of the occupant and much of the sides need to be clear. Therefore it is necessary to create forces and moments of forces with the available surfaces of contact with the occupant support for the connection means. The direction of the forces applied by these connection means will also need to counteract moments of inertial loading forces tending to rotate the occupant orthogonal to the desired axis of rotation.

A second challenge particularly in child seats is the acute shortage of space for any mechanisms that can relocate or reorient the occupant. This space is usually between the seat surface and the mounts on the adult seat surface which can be from less than an inch to about 3".

The present invention has several unique approaches to solve these problems. For example there is one embodiment that uses multiple compression shock absorber with pivotal ends (at most one with a single pivoting end) and a set of slidable connection means, that reorient the child seat so that the open side of the seat at the front of the child faces away from impact during impact. In this embodiment the connection means with a single pivot is located as far forward as possible so that the movement of the head and torso of the occupant about a near vertical axis though this pivot is maximized. As this can only be on the bottom of the seat, this introduces the problem of the distance of this support point (first end for the connection means) from the center of gravity along the desired axis. This distance is substantial and while such a pivot in theory can support a normal torque (as assumed in the background art), without breaking, in practice the pivot acts like a ball joint under heavy loading and therefore counteracting moments of forces need to be supplemented to keep the seat rotating about the desired axis or axes of the pivot over time. This embodiment uses two kinds of connection means to solve this problem. First a compression, tension or even rigid connection means with a pivot at the point of connection towards the front end of the seat bottom. The other end of the connection means may be fixed or also be pivotally supported about a vertical axis. The other connection means are compression shock absorbers that have their first ends attached to the central rear spine of the seat and inclined to be slightly downwards and/or slightly backwards usually this is possible only with a protruding support backwards from the spine. The second end is attached to an outer shell or frame of the child seat that is attached rigidly to the vehicle. In addition this embodiment has connection means with slidable elements that are located at the bottom of the seat with their first ends attached to the seat bottom behind the first compression/tension/rigid connection means and on either side of it there is no significant surface ahead of it). This combination of connection means will reorient the child seat during a side impact with the compression connection means and the sliding connection means providing reaction forces to counter the moment of the couple that will tend to rotate the seat orthogonal to the desired axis.

Another related embodiment uses tension shock absorber in the connection means rather than compression shock absorber at the back of the seat. These are located such that the first ends are attached to the sides of the seat back and slightly forward and higher than the attachment of the second ends to the outer shell or seat frame along the rear spine of that structure.

In both the above embodiments the angle of orientation of the shock absorbers will determine the reaction forces that they will apply to counter the moment of the couple that will tend to rotate the seat orthogonal to the desired axis (near vertical in this case). Moreover pairs of shock absorbers can be used for impact on the two sides. The during impact on one side, the shock absorber not in use may also in some embodiments of the invention decouple to provide more space for relocation of the shell.

Moreover, in both the above embodiments the plurality of compression/tension shock absorbers may be placed—space permitting—on the sides of the seat as well.

For these embodiments using the compression or tension shock absorbers, a further additional embodiment has a slider or rotary dial that engages the second ends of the shock absorbers thereby changing the total force they apply for different aged children. The mechanisms used for such engagement of shock absorbers by a dial or slider are well known in the background art and can simply be cut outs in the back of the dial or slide that allows free movement of the end of one or more shock absorbers thereby disengaging them. They may however stay in location with a weak decoupling joint that fractures on impact.

Yet another related embodiment for a child seat uses connection means with a sliding element either alone or with one connection means with at least one pivoting end at the front center of the seat. In addition to the connection means with sliding elements at the bottom of the seat as in the above two embodiments this embodiment has slidable connection means on the sides of the seat as well. That provide the desired reaction forces to counter the moment of the couple orthogonal to the desired instantaneous rotation axis near the front of the seat. The disclosures in 60/960,067 include examples of this.

Finally another related embodiment uses the "fingers" of compressible and deformable foam with an optional connection means pivoted at one or both ends near the front of the seat. The foam "fingers" may also have either of their ends attached to sliding elements as a part of the connection means that is attached to the child seat or the outer shell/frame.

The arrangement disclosed FIGS. 8-11 will move the occupant to face away from the loading—or ensconce the body thereby providing a larger surface area of contact with the occupant support. This results in two benefits—first the loading on the body per unit area is reduced. Second, the rotational reorientation ensconces the body to prevent it from moving out of the occupant support. This is often the case under severe impact loading conditions.

The arrangement has more rigid shock absorbing elements at the front of the occupant support and softer shock absorbing elements at the rear of the occupant support. This differential resistance from the shock absorbers under loading can also be achieved by having shock absorbers of the same material but with different cross sections as shown in the figures. Equally, materials of dissimilar properties with equal cross sections can be used and all combinations in between.

Each of the shock absorber elements may be slidably attached at one end to allow lateral movement of the inner shell relative to the axis of the shock absorber. As this may not be practical in some embodiments the lateral distortion of the shock absorption elements must be considered for such lateral loadings when rigidly fixed at both ends. If a slidable attachment is chosen these elements may not in some cases be engaged for tensile loadings but only for compressive loadings. Some embodiments may use end stops for the shock absorbers, particularly when they are fabricated from collapsible materials such as foams and aluminum or other hex cell core materials.

Head support: Some embodiments may have a separate head rest with side wings having a microcosm of the same architecture tuned to the mass and related inertial loading of the head. This will require stiffer shock absorbers at the front of the wings and softer shock absorbers towards the rear of the wings on each side of the head for side impact protection so that the head is ensconced by the support. The head support may be mounted on neither the inner or outer shell. IF mounted on the inner shell the shock absorber mechanism will augment the movement induced by the main shock absorber system acting on the inner shell.

Anchors along rear spine of inner shell to the outer shell allow lateral movement of the inner shell but limit forward movement for support during front impact.

In seats the same arrangement may be used to minimize whiplash injury. Narrow section or softer shock absorber embodiments allow greater movement at the top end for whip lash protection.

Broader section or stiffer shock absorption embodiment's provider stiffer support for rear impact support If there is a close spacing of the shock absorption elements and indeed if they are adjoining each other with differential properties, some embodiments may not even have an inner shell as the inner surface of these shock absorbers will provide the surface that contacts the occupant. There may in other embodiments be a fabric or other thin flexible covering of the inner ends of the shock absorber elements.

In applications where there can be intrusion in to the occupant space the inner shell may be constructed of Kevlar or other materials that are resistant to perforation and penetration. While this can be done for the outer shell as well, in some applications it may be beneficial to allow perforation of the outer shell so that the displacement of the occupant is limited.

The outer shell may be attached to the vehicle using conventional methods.

FIG. 2-14 represent some features for head support for lateral impact. Head support: Some embodiments may have a separate head rest with side wings having a microcosm of the same architecture tuned to the mass and related inertial loading of the head. This will require stiffer shock absorbers at the front of the wings and softer shock absorbers towards the rear of the wings on each side of the head for side impact protection so that the head is ensconced by the support. The head support may be mounted on neither the inner or outer shell. IF mounted on the inner shell the shock absorber mechanism will augment the movement induced by the main shock absorber system acting on the inner shell.

The Flex plate architecture of FIGS. 15 and 16 provide yet another approach for shock absorption for side impact.

These may be complemented in some embodiments with sliding arrangements at the bottom of the child seat with a pivotal attachment (in some embodiments spring loaded) for rotation.

Anchors along rear spine of inner shell to the outer shell (as in the Bunge Sling embodiment) allow lateral movement of the inner shell but limit forward movement for support during front impact. (FIG. 19.)

Another aspect of the invention disclose here is a "bunge sling" which is a special form of the connection means noted above with a spring damper combination that is attached at its first end to the inner shell at the back of the occupant and attached at its other end to the outer shell or the vehicle. In the event of a frontal impact this bunge sling allows limited motion forward of the occupant support and the occupant with a harness installed, and thereby reduces the peak acceleration of the thorax and head during frontal impact of the vehicle. The other connection means may continue to operate or disconnect during this motion.

Another series of embodiments of the dynamic child seat in this invention uses reaction bearings both at the back and the sides on surfaces on the dynamic or moving shell to guide the shell in the desired direction to reorient the child in an impact.

The Rear bearing is spring mounted as shown to accommodate the vertical shock at impact but retain the seat in the desired direction soon thereafter by damping the energy of the impact. The side bearings are also spring loaded with the long spring axles that they are mounted upon.

These are principally actions that are used to mitigate the lateral impact situations by reducing the peak acceleration of the occupant and reorienting the occupant in such an impact.

The Bunge sling at the back of the seat is operative at the time of a front impact by deforming to allow the top of the seat to move forward. The bottom of the seat under the base is fixed to a pivot that will allow this motion. The result is a damped front impact loading.

Preferred Embodiment

Dynamic Child Seat

The embodiment of a dynamic child seat that rotates about a substantially vertical axis on side impact and moves forward on front impact controlled by a Bunge Sling. The Figures show the position of the seatshell during impact and is shown rotated away from the side impact direction. It also shows the placement of the frame on the base and the notch that engages the frame for lateral stability. The pillow pads that support the head laterally and the rear head rest are not shown but the rotated position of the seat shell shows the left side arm of the head assembly ensconcing the head in the impact position.

FIG. 36 shows the embodiment of the dynamic child seat with the attachment to the tether marked and the slide bar shown with one or more pins that engage a sliding surface on the seat shell to allow rotation about the impact rotation axis. The pins (not shown) (which may be spring mounted) limit vertical motion of the seat shell. It also shows Pairs of feet on either side support the frame in front. A lateral bar (not shown) engages the slot shown and is spring loaded to be in the rear position of the slot normally in can be drawn forward manually to the front of the slot to disengage one of the multiple slots in the two towers attached to the base thereby changing the height of the front of the frame and the resulting inclination. And the pivot for inkling the seat frame particularly in the rear facing position.

FIG. 37 shows the dynamic child seat frame. The Upper and lower channel shown house spring damper assemblies—one on each side.

The Upper edge of one or both the channels that support the spring damper assembly has a slightly inclined top surface with a lower front edge so that when the pin or flange attached to the seat and supporting the Spring damper assembly rises on the side away from the impact it is captured by the slot preventing a rocking of the seat and channeling the energy to rotation about a near vertical axis. Also shown is the slot that houses a front brace that has a sliding surface and a pin both of which rides on a sliding surface coaxial with the impact rotation pivot shown. The pin engages the slot in the surface to prevent vertical motion of the seat at its edge during impact. This pin may be spring loaded to return the impact energy if raised, to the seat for its rotation. Also shown is the Pivot-impact rotation axis that may have a spring mount to allow a short axial displacement for redeploying the initial impact loading that can tend to rotate the seat about a horizontal axis. Notably the Pivot is designed such that on front impact the axis can bend or tilt forward and work in conjunction with the Bunge Sling to control the motion of the occupant in a front impact.

FIG. 38 shows the end of the upper channel that provides the reaction surface for the spring damper assembly during rotation of the frame following side impact.

FIG. 39 shows the cavity for metal reinforcement that is an extension to the tether support, the metal strip extends in this embodiment to wrap over the lower pivot hinge. This provides a rigid connection between the tether and the pivot rod at the bottom that is connected to the latches.

FIG. 40 Dynamic Child Seat—Headrest Height Adjust Arm. 1. The actuation lever in the normal position will be away from the back of the head assembly support stalk and be depressed towards the head rest support stalk to disengage the pins and move the head rest.

2. In other embodiments, with the pins located between the actuation lever and the pivot the normal position of the actuation lever will be next to the head assembly support stalk and be pulled out to disengage the pins.

In case 1. above a safety catch can be created (either pivotally or slidably attached to the stalk or the lever to fall between the stalk and the lever and color or marks indicating this position for safety.

In case 2. a safety catch may be pivotally or slidably attached to the stalk to capture (with a loop) the lever for the safe position. coding being visible.

The Pivot for the height adjustment arm would usually be spring loaded to engage the socket holes in the normal position. The pivot in this embodiment is on the head assembly support stalk. However it may also be supported on the seat shell with multiple sets of holes on the head assembly support stalk to allow different heights.

The Actuation lever is shown.

Pins engage corresponding holes in the head rest support stalk to which the height adjustment arm is attached. It also engages multiple sets of such holes on the sheath on the seat shell containing the head assembly support stalk, thereby allowing multiple positions for the height of the seat support stalk on the seat shell.

FIG. 41 Dynamic Child Seat—Head Assembly support stalk. Shows:

Pivot for attachment of the headrest height adjustment arm

Pivot support for attachment of the rear head rest. The rear headrest is pivoted to allow greater conformity with the rear of the head and neck.

The ends of the side arms support the pillow-pads (not shown) that provide lateral support for the child's head and face. Many embodiments allow the attachment to be pivoted about a substantially vertical axis so that it can tilt back on side impact thereby containing the head.

Pin holes (not shown) will be arranged in a line to accommodate the pins on the headrest height adjusting arm. These same pin holes will engage multiple sets of holes on the sheath at the back of the seat shell to allow multiple positions of the Head Assembly Support Stalk on the Seat shell.

FIG. 42 Dynamic Child Seat—Seat shell assembly. Shows:

Pins that may engage one or both sides of the sheath on the seat shell housing the head assembly support stalk.

Inner edge of spring damper assembly which is secured to the seat shell. Some embodiments have a flange that engages the slot on the frame with a small clearance.

Headrest height adjustment arm

Position in some embodiments of the right spring damper assembly. Similar assemblies will be on the left and at the lower position as indicated on the frame.

Head assembly support stalk

FIG. 43, 44 Dynamic Child Seat—Base. Shows:

Notches that capture frame in lowest (front facing) position

Pivot for tilting the frame when seat is in the rear facing position

Pair of towers with notches that engage a lateral bar on the frame for different inclinations of the frame on the base. The frame will pivot on the rear Pivot Sides beveled for car seat shape FIG. 45 Dynamic Child Seat—Bunge Sling Assembly. Shows:

The Bunge Sling that stretches out on front impact to damp acceleration. Rear center of Bunge sling is attached to the frame.

The Bunge Pin that slides inside Bunge Pin Slot attached to seat shell. On side impact the pin slides out. On front impact the pin engages the slot to provide a reactive force. Some embodiments of the slot have a depression on the inner surface of the slot that the pin will move into on motion of the slot forward on front impact, thereby securing the pin further in the slot.

FIG. 46 Dynamic Child Seat—Bunge Sling Assembly. Shows:

Bunge slot that engages Bunge pin during front impact and allows the bunge pin to slide out of the sides during a side impact.

Bunge slot has a cut out to avoid contact with the headrest height adjustment arm Support of the Bunge slot to the seat shell straddles the head assembly support stalk and its housing on the seat shell.

FIG. 47 Dynamic Child Seat—Bunge Sling. Shows:

Each of the two side that in their center attach to the frame and the seat shell respectively.

One or more points for securing bunge sling some embodiments use a hole and securing pin.

The sides of the Bunge sling stretch out as the two support points are pulled apart. The materials are designed to provide energy absorption and elastic properties to minimize injury for the occupant.

FIG. 48 Dynamic Child Seat—Bunge Slot. Shows:

The depression in this embodiment engages the Bunge Pin on front impact to secure it further. The normal position of the Bunge pin will not engage the depression.

Support points on Shell. Bunge slot is secured at points that straddle the head assembly support stalk. In other embodiments it can be secured closer to the center if slots are created in the head assembly support stalk.

Cut out prevents contact from the head rest height adjustment arm.

Additional Embodiments

With reference to the embodiments of Ser. No. 11/639,088 this embodiment has an additional feature designed to relocate the occupant support away from the impact in the event of an intrusion into the vehicle in the vicinity of the vehicle support mechanism. One such embodiment shall have a push rod that has its end protruding from the side of the sub base on the outer side of the seat facing the intrusion such that a significant intrusion will depress the push rod, and the other end of the push rod designed to decouple the attachment of the shock absorber from its end 239 B as in FIG. 43 of that application. The push rod being supported by the sub base body. In the invent of an intrusion that depresses the end of the push rod, the shock absorber gets decoupled along with the crush bar and the shell with the occupant is free to slide on the slides to the extent necessary up to the end of the side bars on the sub base. Depression of the crush bar or the push rod alone will also permit the relocation to reduce crush injury.

With reference to the embodiments of Ser. No. 11/639,088 this embodiment has an additional feature wherein the pillow pads pivot on the support axis and are spring damper loaded for that motion. This provides additional shock absorption of the head in a frontal impact as the two pillow pads support the head and the head moves downwards about the occipital condoyle and the neck vertebral joints thereby rotating the spring damper loaded pillow pads with them.

With reference to the embodiments of Ser. No. 11/639,088 this embodiment has an additional feature wherein the pillow pads are spring damper loaded along the axis of the support axis. Thereby in the lateral impact the pillow pads are also adapted to move laterally and reduce the peak acceleration and the resulting potential injury.

CONCLUSIONS, RAMIFICATIONS & SCOPE

It will become apparent that the present invention presented, provides a new structures for greater convenience comfort and safety for users. Each embodiment has its unique benefits and offer new paradigms in this invention.

The invention claimed is:

1. A child seat in a vehicle adapted to reorient and ensconce and thereby protect the occupant attached thereto upon inertial loading by the occupant resulting from impact to the vehicle on the child seat such that the reaction force of the occupant support system on the occupant is distributed over one or both of: a larger surface area of the occupant; and a larger time period, thereby reducing injury to the occupant, a path of said reorientation being enabled by one or both of differences in deform properties and cross section among a plurality of separate connection fingers each with spaced apart first and second ends along a length, and two corresponding support surfaces, wherein said fingers each have a first end attached to a first support surface supporting the occupant and a second end attached to a second support surface on the vehicle and wherein the first ends are enabled to move in a plurality of paths with a corresponding plurality of loading distributions on said first ends.

2. An occupant support system as in claim 1, wherein said reorientation of the occupant occurs in at least one movable shell directly or indirectly attached to at least one part of the occupant anatomy, said reorientation occurring relative to a static shell attached to the vehicle.

3. An occupant support system as in claim 1, wherein a plurality of said fingers comprise one or both of: foams; and hexcell core materials.

4. An occupant support system in a vehicle, as in claim 3, further comprising an end-stop for at least one finger.

5. An occupant support system as in claim 1, wherein at least one of the attachments on the first end and the second end of at least one finger is pivotal.

6. An occupant support system as in claim 1, wherein at least one of said attachments of at least one of said fingers is a sliding attachment.

7. An occupant support system as in claim 1, wherein said fingers have connections there-between.

8. An occupant support system as in claim 1 wherein deformation of the fingers is enabled by differential material properties therein.

9. An occupant support system as in claim 1 wherein deformation of the fingers is enabled by cross sections perpendicular to longitudinal axes of the fingers having different cross section areas.

10. An occupant support system as in claim 1, wherein said fingers are with differential properties and connections there-between.

\* \* \* \* \*

UNITED STATES PATENT AND TRADEMARK OFFICE
CERTIFICATE OF CORRECTION

PATENT NO. : 8,864,229 B2
APPLICATION NO. : 12/451317
DATED : October 21, 2014
INVENTOR(S) : Arjuna Indraeswaran Rajasingham It is certified that error appears in the above-identified patent and that said Letters Patent is hereby corrected as shown below:

Claims

Correction of "An occupant support" to "a child seat" in claims 2-10.

Claims to read as follows:

1. A child seat in a vehicle adapted to reorient and ensconce and thereby protect the occupant attached thereto upon inertial loading by the occupant resulting from impact to the vehicle on the child seat such that the reaction force of the occupant support system on the occupant is distributed over one or both of: a larger surface area of the occupant; and a larger time period, thereby reducing injury to the occupant, a path of said reorientation being enabled by one or both of differences in deform properties and cross section among a plurality of separate connection fingers each with spaced apart first and second ends along a length, and two corresponding support surfaces, wherein said fingers each have a first end attached to a first support surface supporting the occupant and a second end attached to a second support surface on the vehicle and wherein the first ends are enabled to move in a plurality of paths with a corresponding plurality of loading distributions on said first ends.

2. A child seat as in claim 1, wherein said reorientation of the occupant occurs in at least one movable shell directly or indirectly attached to at least one part of the occupant anatomy, said reorientation occurring relative to a static shell attached to the vehicle.

3. A child seat as in claim 1, wherein a plurality of said fingers comprise one or both of: foams; and hexcell core materials.

4. A child seat in a vehicle, as in claim 3, further comprising an end-stop for at least one finger.

5. A child seat as in claim 1, wherein at least one of the attachments on the first end and the second end of at least one finger is pivotal.

Signed and Sealed this
Twenty-first Day of June, 2016

Michelle K. Lee
*Director of the United States Patent and Trademark Office*

6. A child seat as in claim 1, wherein at least one of said attachments of at least one of said fingers is a sliding attachment.

7. A child seat as in claim 1, wherein said fingers have connections there-between.

8. A child seat as in claim 1 wherein deformation of the fingers is enabled by differential material properties therein.

9. A child seat as in claim 1 wherein deformation of the fingers is enabled by cross sections perpendicular to longitudinal axes of the fingers having different cross section areas.

10. A child seat as in claim 1, wherein said fingers are with differential properties and connections there-between.